United States Patent
Kurata et al.

(10) Patent No.: US 8,996,294 B2
(45) Date of Patent: Mar. 31, 2015

(54) INTER-VEHICLE DISTANCE MAINTENANCE SUPPORTING SYSTEM AND METHOD

(75) Inventors: Kazunori Kurata, Atsugi (JP); Nariaki Etori, Machida (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 822 days.

(21) Appl. No.: 12/337,397

(22) Filed: Dec. 17, 2008

(65) Prior Publication Data
US 2009/0164080 A1 Jun. 25, 2009

(30) Foreign Application Priority Data

Dec. 19, 2007 (JP) .................................. 2007-327068
Aug. 8, 2008 (JP) .................................. 2008-205852

(51) Int. Cl.
  *B60K 31/00* (2006.01)
  *G08G 1/16* (2006.01)

(52) U.S. Cl.
  USPC .............. 701/301; 701/96; 340/903; 340/435

(58) Field of Classification Search
  USPC ............... 701/96, 93, 301; 340/903, 907, 435
  See application file for complete search history.

(56) References Cited

U.S. PATENT DOCUMENTS

| | | | | |
|---|---|---|---|---|
| 4,628,317 A * | 12/1986 | Nishikawa et al. | ........... | 340/903 |
| 6,169,478 B1 * | 1/2001 | Hada et al. | ..................... | 340/435 |
| 6,538,622 B1 * | 3/2003 | Kojima et al. | ..................... | 345/7 |
| 6,577,947 B1 * | 6/2003 | Kronfeld et al. | .............. | 701/202 |
| 7,039,551 B2 * | 5/2006 | Shu et al. | ....................... | 702/182 |
| 7,821,422 B2 * | 10/2010 | Hutchison et al. | ............. | 340/907 |
| 7,894,988 B2 * | 2/2011 | Kimura et al. | ................. | 701/301 |
| 2005/0010351 A1 | 1/2005 | Wagner et al. | | |
| 2005/0073433 A1 * | 4/2005 | Gunderson et al. | ........... | 340/903 |
| 2005/0085984 A1 * | 4/2005 | Uhler et al. | ...................... | 701/70 |
| 2007/0083313 A1 * | 4/2007 | Uhler et al. | ...................... | 701/70 |
| 2007/0213916 A1 * | 9/2007 | Sugano et al. | ................... | 701/96 |
| 2008/0109120 A1 * | 5/2008 | Sawamoto | ........................ | 701/1 |
| 2008/0189040 A1 * | 8/2008 | Nasu et al. | ..................... | 701/301 |

(Continued)

FOREIGN PATENT DOCUMENTS

DE 4314827 A1 * 11/1994
EP 1661751 (B1) 1/2008

(Continued)

OTHER PUBLICATIONS

U.S. Appl. No. 12/337,420, filed Dec. 17, 2008, Kobayashi et al.

(Continued)

*Primary Examiner* — Tan Q Nguyen
(74) *Attorney, Agent, or Firm* — Foley & Lardner LLP

(57) ABSTRACT

An inter-vehicle distance maintenance supporting system for a host vehicle can include an obstacle detector that detects the obstacle present ahead of the host vehicle, an inter-vehicle distance detector that detects the inter-vehicle distance between the host vehicle and the obstacle, a confidence factor computing device that computes the confidence factor for taking the obstacle as a preceding vehicle ahead of the host vehicle based on the state of the obstacle detected by the obstacle detector, a confidence factor correcting part that corrects the confidence factor based on the relative-position relationship between the host vehicle and the obstacle, and a reaction force controller that applies a reaction force on the accelerator pedal based on the inter-vehicle distance and the confidence factor.

15 Claims, 29 Drawing Sheets

(56) References Cited

U.S. PATENT DOCUMENTS

2009/0326820 A1* 12/2009 Shimizu .................. 701/301
2012/0010808 A1* 1/2012 Yokoyama et al. .......... 701/301

FOREIGN PATENT DOCUMENTS

| JP | 2004-249891 A | | 9/2004 |
|---|---|---|---|
| JP | 2004-249891 (A) | | 9/2004 |
| JP | 2007022239 A | * | 2/2007 |

OTHER PUBLICATIONS

Nissan Motor Company, Safety Activities Technology Overview, Nissan's Approach to Safety, Aug. 2006.

* cited by examiner

INTER-VEHICLE DISTANCE MAINTENANCE SUPPORTING SYSTEM AND METHOD

CROSS-REFERENCE TO RELATED APPLICATIONS

This application claims priority from Japanese Patent Application Serial No. 2007-327068, filed on Dec. 19, 2007, and Japanese Patent Application Serial No. 2008-205852, filed Aug. 8, 2008, each of which is incorporated herein by reference in its entirety.

TECHNICAL FIELD

The present invention pertains to an inter-vehicle distance maintenance supporting system and an inter-vehicle distance maintenance supporting method.

BACKGROUND

The related art describes technology related to reaction force control for reducing discomfort of the driver. For example, Japanese Kokai Patent Application No. 2004-249891 describes an auxiliary device for driving vehicles. With this device, based on a confidence factor of false recognition and a confidence factor that an object is not present, a risk potential is computed, and, corresponding to the risk potential, a pattern of change in the reaction force generated in the vehicle equipment is corrected, so that the reaction force characteristics are taken to be good characteristics when the obstacle is not an object for reaction force control.

SUMMARY

Disclosed herein is an inter-vehicle distance maintenance supporting system for a host vehicle that provides an improved support running of a host vehicle. According to one embodiment of the present invention, an inter-vehicle distance maintenance supporting system for a host vehicle may include an obstacle detector configured to detect an obstacle ahead of the host vehicle, an inter-vehicle distance detector configured to detect an inter-vehicle distance between said host vehicle and said obstacle, a confidence factor computing device configured to compute a confidence factor for treating the obstacle as a preceding vehicle ahead of the host vehicle based on a state of the obstacle detected by said obstacle detector, a confidence factor correcting part configured to correct said confidence factor based on a relative-position relationship between said host vehicle and said obstacle, and a reaction force controller configured to apply a reaction force on an accelerator pedal based on said inter-vehicle distance detected by said inter-vehicle distance detector and said confidence factor corrected by said confidence factor correcting part.

According to another embodiment of the present invention, an inter-vehicle distance maintenance supporting system for a host vehicle may include an obstacle detector configured to detect an obstacle ahead of the host vehicle, an inter-vehicle distance detector configured to detect an inter-vehicle distance between said host vehicle and said obstacle, a confidence factor computing device configured to compute a confidence factor for treating the obstacle as a preceding vehicle ahead of the host vehicle based on a state of the obstacle detected by said obstacle detector, an accelerator pedal depression detector configured to detect depression of an accelerator pedal, a confidence factor correcting part configured to correct said confidence factor based on the depression of said accelerator pedal, and a reaction force controller configured to apply a reaction force on the accelerator pedal based on said inter-vehicle distance detected by said inter-vehicle distance detector and said confidence factor corrected by said confidence factor correcting part.

According to another embodiment of the present invention, an inter-vehicle distance maintenance supporting method for a host vehicle may include detecting an obstacle ahead of the host vehicle, detecting an inter-vehicle distance between said host vehicle and said obstacle, computing a confidence factor for treating the obstacle as a preceding vehicle of the host vehicle based on a detected obstacle state, correcting said confidence factor based on a relative-position relationship between said host vehicle and said obstacle, and applying a reaction force based on the inter-vehicle distance and the corrected confidence factor.

According to another embodiment of the present invention, an inter-vehicle distance maintenance supporting method for a host vehicle may include detecting an obstacle ahead of the host vehicle, detecting an inter-vehicle distance between said host vehicle and said obstacle, computing a confidence factor for treating the obstacle as a preceding vehicle of the host vehicle based on a detected obstacle state, detecting a depression of an accelerator pedal, correcting said confidence factor based on the depression of the accelerator pedal, and applying a reaction force based on the inter-vehicle distance and the corrected confidence factor.

According to another embodiment of the present invention, an inter-vehicle distance maintenance supporting system for a host vehicle may include an obstacle detecting means for detecting an obstacle ahead of the host vehicle, an inter-vehicle distance detecting means for detecting an inter-vehicle distance between said host vehicle and said obstacle, a confidence factor computing means for computing a confidence factor for treating the obstacle as a preceding vehicle ahead of the host vehicle based on a state of the obstacle detected by said obstacle detecting means, a confidence factor correcting means for correcting said confidence factor based on a relative-position relationship between said host vehicle and said obstacle, and a reaction force controlling means for applying a reaction force on an accelerator pedal based on said inter-vehicle distance detected by said inter-vehicle distance detecting means and said confidence factor corrected by said confidence factor correcting means.

According to another embodiment of the present invention, an inter-vehicle distance maintenance supporting system for a host vehicle may include an obstacle detecting means for detecting an obstacle ahead of the host vehicle, an inter-vehicle distance detecting means for detecting an inter-vehicle distance between said host vehicle and said obstacle, a confidence factor computing means for computing a confidence factor for treating the obstacle as a preceding vehicle ahead of the host vehicle based on a state of the obstacle detected by said obstacle detecting means, an accelerator pedal depression detecting means for detecting depression of an accelerator pedal, a confidence factor correcting means for correcting said confidence factor based on the depression of said accelerator pedal, and a reaction force controlling means for applying a reaction force on the accelerator pedal based on said inter-vehicle distance detected by said inter-vehicle distance detecting means and said confidence factor corrected by said confidence factor correcting means.

BRIEF DESCRIPTION OF DRAWINGS

These and other features, aspect, and advantages of the present invention will become apparent from the following description, appended claims, and the accompanying exemplary embodiments shown in the drawings, which are briefly described below.

DETAILED DESCRIPTION

In the auxiliary device for driving vehicles in the related technology of the related art, if the preceding vehicle, as an object of reaction force control, temporarily moves to the adjacent lane, or if the host vehicle changes lanes so that the preceding vehicle is no longer detected, the accelerator pedal reaction force is quickly changed and transmitted to the driver. Consequently, it cannot be associated with a driver's prediction, so that discomfort is felt by the driver. This is undesirable. In the following, an explanation will be given regarding an example of an inter-vehicle distance maintenance supporting system that can prevent such a feeling of discomfort.

Embodiment 1

Figure 1:
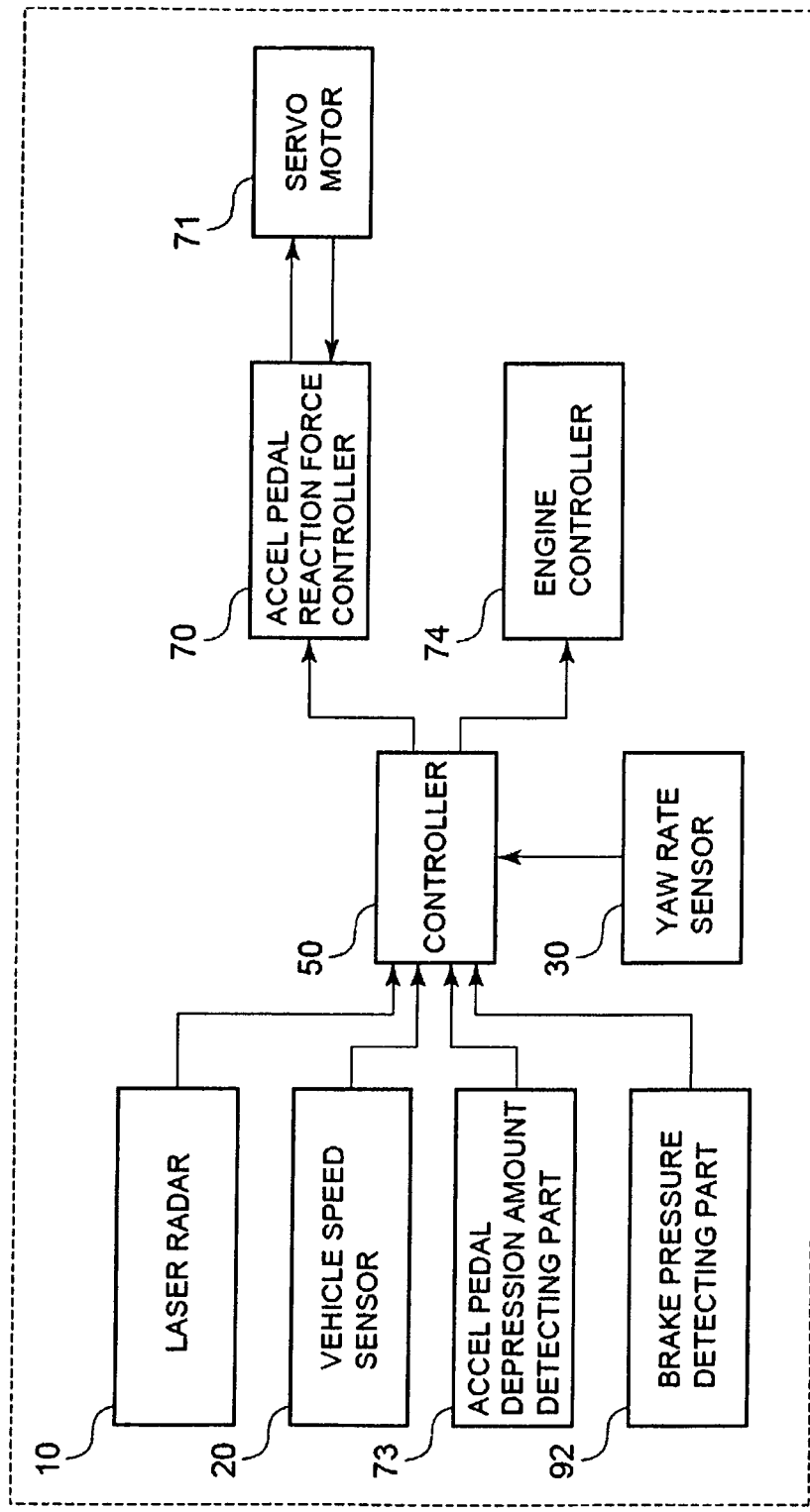
FIG. 1 is a system diagram illustrating the inter-vehicle distance maintenance supporting system in an embodiment of the present invention.
Figure 2:
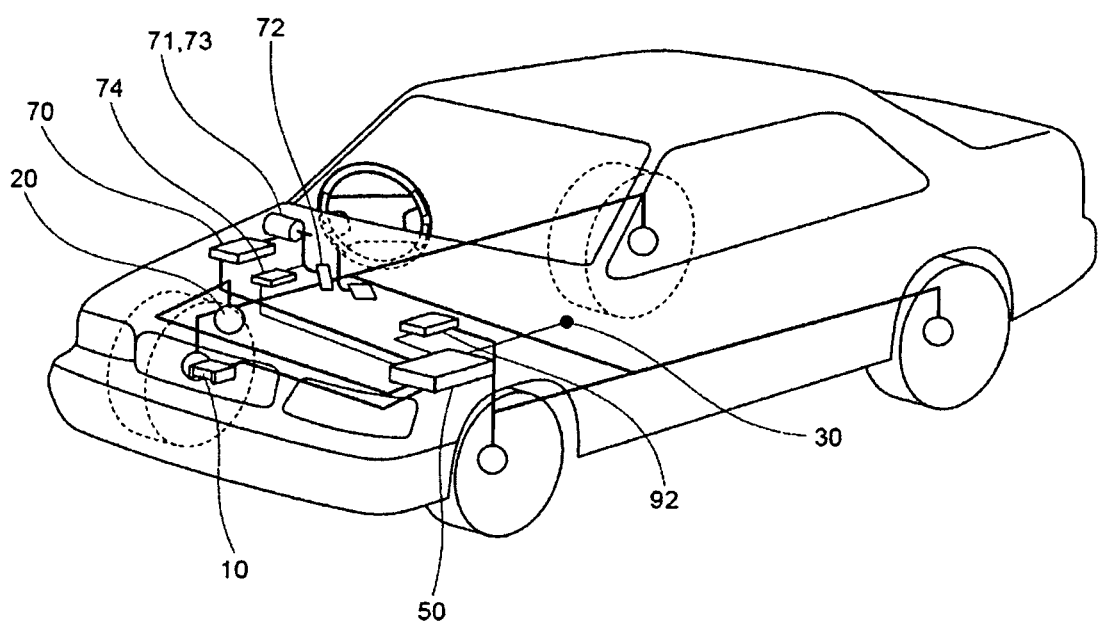
FIG. 2 is a diagram illustrating the vehicle using the inter-vehicle distance maintenance supporting system shown in FIG. 1.

In the following, an explanation will be given regarding the inter-vehicle distance maintenance supporting system of Embodiment 1 of the present invention with reference to the figures. FIG. 1 is a system diagram illustrating the inter-vehicle distance maintenance supporting system 1 of Embodiment 1 of the present invention. FIG. 2 is a diagram illustrating the vehicle using inter-vehicle distance maintenance supporting system 1.

First, the inter-vehicle distance maintenance supporting system 1 will be explained. Here, laser radar 10 is installed on the front grill or bumper of the vehicle. It emits IR light pulses in the horizontal direction to scan the region ahead of the vehicle. Laser radar 10 measures the reflected waves of IR light pulses reflected from plural reflective objects (usually the rear end of the preceding vehicle) ahead of the host vehicle, and, from the arrival time of the reflected waves, it detects the individual inter-vehicle distances of plural preceding vehicles and their direction. The detected inter-vehicle distance and the direction are output to controller 50. In the present embodiment, the direction of the object ahead of the vehicle can be represented by the relative angle with respect to the host vehicle. The laser radar 10 scans about ±60° of the front region with respect to the normal direction of the front of the host vehicle, and objects ahead of the host vehicle present in said range can be detected.

In this case, vehicle speed sensor 20 detects the speed of the host vehicle by measuring the rotational velocity of the wheels and the rotational velocity from the transmission, and it outputs the detected host vehicle speed to controller 50.

Here, yaw rate sensor 30 detects the yaw rate of the vehicle, that is, the vehicle turning speed, and it outputs the detected yaw rate to controller 50.

Controller 50 comprises a CPU as well as ROM, RAM and other CPU peripheral devices. It performs overall control of inter-vehicle distance maintenance supporting system 1. Controller 50 uses the distance information input from laser radar 10 and the host vehicle speed input from vehicle speed sensor 20 to recognize the state of obstacles around the host vehicle, such as the relative distance and the relative speed between the host vehicle and each obstacle as the running state with respect to the obstacle. Based on the obstacle state, controller 50 computes the confidence factor for the obstacle ahead of the host vehicle, the first inter-vehicle distance threshold and the second inter-vehicle distance threshold. Then, it performs the following control based on the computed confidence factor, the first inter-vehicle distance threshold and the second inter-vehicle distance threshold.

Inter-vehicle distance maintenance supporting system 1 controls the reaction force generated when accelerator pedal 72 is depressed, so that the driver is notified of the surrounding environment, and the inter-vehicle distance maintenance supporting system can thus appropriately assist the driver, especially in maintaining an appropriate inter-vehicle distance with an obstacle ahead of the host vehicle. Also, by controlling the output amount of the engine torque with respect to the depression amount of accelerator pedal 72, in the case of tracking mode, where said obstacle ahead of the host vehicle is tracked, it is possible to reduce operations performed by the driver in correcting accelerator pedal 72 and thus to reduce the physical load on the driver. At the same time, as the depression amount of accelerator pedal 72 is usually larger than that in the related art, by controlling the operation reaction force, it is easier to inform the driver of the operation reaction force generated at accelerator pedal 72. In addition, when the output amount of the engine torque with respect to the accelerator pedal depression amount is reset to the normal relationship, by means of resetting corresponding to the accelerator pedal depression operation of the driver, it is possible to reduce discomfort caused by acceleration of the host vehicle even though the depression amount of accelerator pedal 72 is constant.

Inter-vehicle distance maintenance supporting system 1 also corrects the accelerator pedal operation reaction force and the engine torque output amount corresponding to the confidence factor that there is an obstacle ahead of the host vehicle. Here, the confidence factor of the obstacle ahead of the host vehicle is defined as the value indicating the confidence of the presence of an obstacle ahead of the host vehicle, that is, the confidence of the presence of an obstacle ahead of the host vehicle that becomes the object related to control of the operation reaction force and the engine torque. That is, it is defined as the value that represents the confidence of the ability to judge that an obstacle ahead of the host vehicle is indeed a preceding vehicle ahead of the host vehicle. By performing correction corresponding to the confidence factor of the obstacle ahead of the host vehicle, in the case when the host vehicle is passing the obstacle ahead of the host vehicle or a similar case when there is a deviation in the lateral position between the host vehicle and the obstacle ahead of the host vehicle, control can be released at an earlier time, so that the feeling of discomfort of the driver can be reduced.

More specifically, controller 50 computes the confidence factor for the obstacle ahead of the host vehicle from the relationship in lateral position (left/right direction) between the host vehicle and the obstacle ahead of the host vehicle. Then, based on the first inter-vehicle distance threshold for the obstacle ahead of the host vehicle, the target accelerator pedal reaction force is computed, and the computed target accelerator pedal reaction force is corrected corresponding to the confidence factor. The computed target correction value of the accelerator pedal reaction force is output to accelerator pedal reaction force controller 70.

Then, controller 50 computes the target accelerator opening based on the second inter-vehicle distance threshold with respect to the obstacle ahead of the host vehicle and the accelerator pedal depression amount by the driver. Then, the computed target accelerator opening is corrected corresponding to the confidence factor, and the corrected target accelerator opening is output to engine controller 74. Also, based on the accelerator pedal depression amount by the driver detected by accelerator pedal depression amount detecting part 73, controller 50 judges whether the depression accelerator pedal 72 is depressed. When the target accelerator opening is reset to the accelerator pedal depression amount by the driver, controller 50 outputs the result of the target accelerator opening resetting treatment based on the determined accelerator pedal depression to engine controller 74.

Corresponding to the reaction force control amount output from controller 50, accelerator pedal reaction force controller 70 controls the torque generated by servo motor 71 assembled in the link mechanism of accelerator pedal 72. Servo motor 71 controls the reaction force generated corresponding to the instruction value from accelerator pedal reaction force controller 70, and it can control the depression force generated when the driver depresses accelerator pedal 72 at will. Also, accelerator pedal depression amount detecting part 73 is connected via a link mechanism to accelerator pedal 72. Accelerator pedal depression amount detecting part 73 detects the depression amount (operation amount) of accelerator pedal 72 converted to the rotating angle of servo motor 71 via a link mechanism, and outputs it to controller 50.

Also, with regard to the conventional accelerator pedal reaction force characteristics when the accelerator pedal reaction force is not controlled, for example, the accelerator pedal reaction force is set to be greater when the operation amount of accelerator pedal 72 is greater. The conventional accelerator pedal reaction force characteristics can be realized by means of, for example, the elastic force of a torsion spring (not shown in the figure) set to the rotating center of accelerator pedal 72.

Engine controller 74 controls the generated engine torque to correspond to the target accelerator opening output from controller 50. Engine controller 74 presets a relationship of the engine torque generation amount corresponding to the accelerator pedal depression amount. Here, engine controller 74 controls the engine torque by determining the engine torque generation amount based on the target accelerator opening output from controller 50 instead of the actual accelerator pedal depression amount due to depression by the driver, and adjusting the degree of opening of, for example, a throttle valve. That is, the target accelerator opening is the control instruction value of the engine torque.

Figure 3:
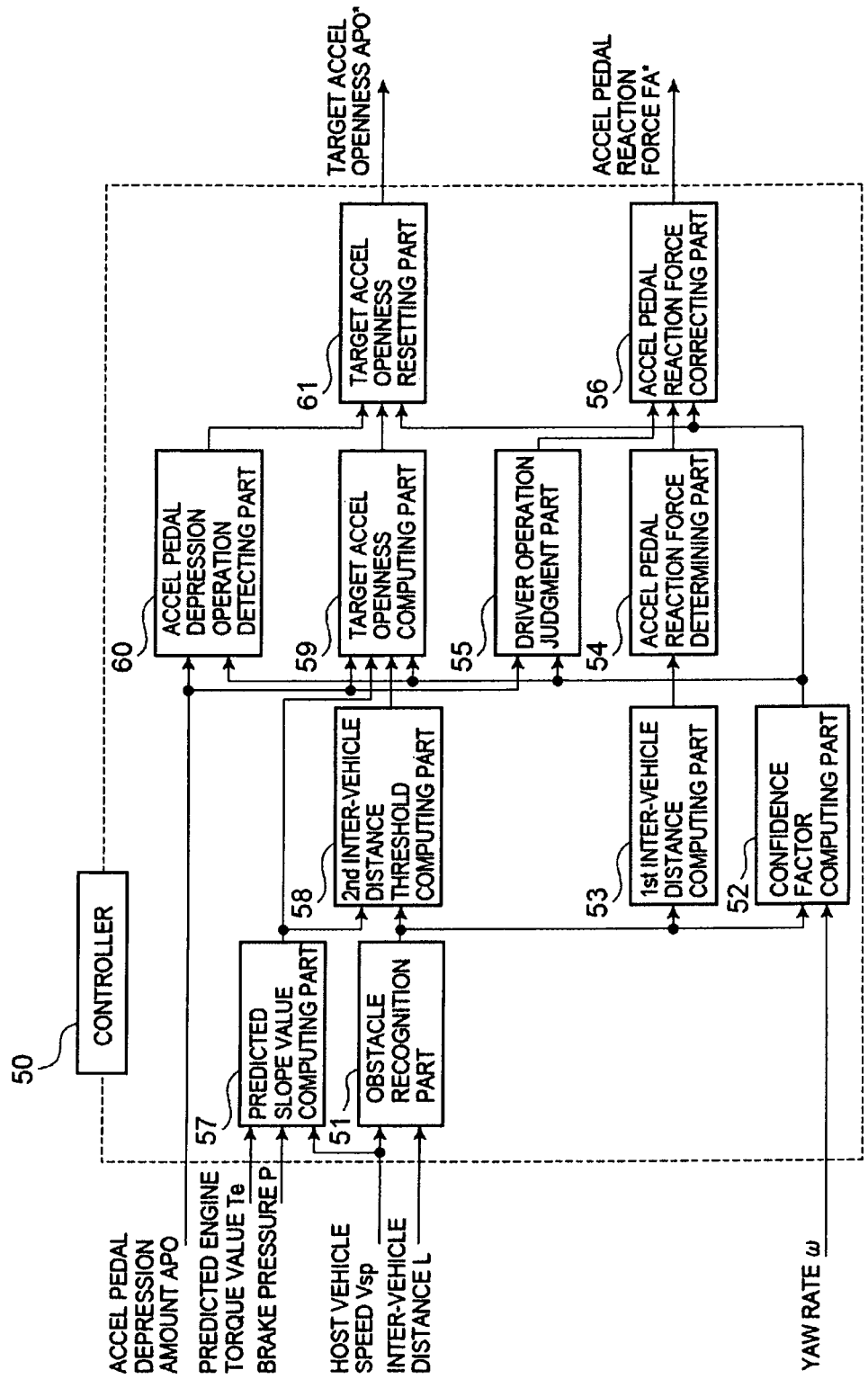
FIG. 3 is a block diagram illustrating an arrangement of the controller.

FIG. 3 is a block diagram illustrating an arrangement of controller 50. For example, controller 50 may comprise the following parts depending on the CPU software: obstacle recognition part 51, confidence factor computing part 52, first inter-vehicle distance threshold computing part 53, accelerator pedal reaction force determining part 54, driver operation judgment part 55, accelerator pedal reaction force correcting part 56, predicted slope value computing part 57, second inter-vehicle distance threshold computing part 58, target accelerator opening computing part 59, accelerator pedal depression operation detecting part 60, and target accelerator opening resetting part 61.

Obstacle recognition part 51 computes the inter-vehicle distance and relative speed to an obstacle, such as the preceding vehicle, ahead of the host vehicle based on the signal input from laser radar 10. In addition, it detects the state of the obstacle ahead of the host vehicle from the inter-vehicle distance, the relative speed, and the host vehicle speed input from vehicle speed sensor 20. Confidence factor computing part 52 computes the confidence factor of the obstacle preset ahead of the host vehicle based on the yaw rate of the host vehicle input from yaw rate sensor 30.

First inter-vehicle distance threshold computing part 53 computes the first inter-vehicle distance threshold with respect to the obstacle ahead of the host vehicle based on the obstacle state input from obstacle recognition part 51. Accelerator pedal reaction force determining part 54 determines the accelerator pedal reaction force applied on accelerator pedal 72 based on the first inter-vehicle distance threshold computed by first inter-vehicle distance threshold computing part 53 and the inter-vehicle distance input from obstacle recognition part 51. Driver operation judgment part 55 judges whether the driver is depressing accelerator pedal 72 based on the accelerator pedal depression amount input from accelerator pedal depression amount detecting part 73 and the confidence factor computed by confidence factor computing part 52. Accelerator pedal reaction force correcting part 56 uses the judgment result of driver operation judgment part 55 and the confidence factor computed by confidence factor computing part 52 to correct the accelerator pedal reaction force computed by accelerator pedal reaction force determining part 54, and outputs the corrected accelerator pedal reaction force to accelerator pedal reaction force controller 70.

Second inter-vehicle distance threshold computing part 58 computes the second inter-vehicle distance threshold with respect to the obstacle ahead of the host vehicle based on the state of the obstacle input from obstacle recognition part 51. On the basis of the second inter-vehicle distance threshold computed by second inter-vehicle distance threshold computing part 58, the accelerator pedal depression amount input from accelerator pedal depression amount detecting part 73, and the confidence factor computed by confidence factor computing part 52, target accelerator opening computing part 59 computes the target accelerator opening (final value of the target accelerator opening) for use as the control instruction value of the engine torque to be finally realized.

From the accelerator pedal depression amount input from accelerator pedal depression amount detecting part 73 and the confidence factor computed by confidence factor computing part 52, accelerator pedal depression operation detecting part 60 detects the accelerator pedal depression operation by the driver. On the basis of the detection result of accelerator pedal depression operation detecting part 60 and the confidence factor computed by confidence factor computing part 52, target accelerator opening resetting part 61 resets the final value of the target accelerator opening computed by target accelerator opening computing part 59, and it re-computes the target accelerator opening.

Figure 4:
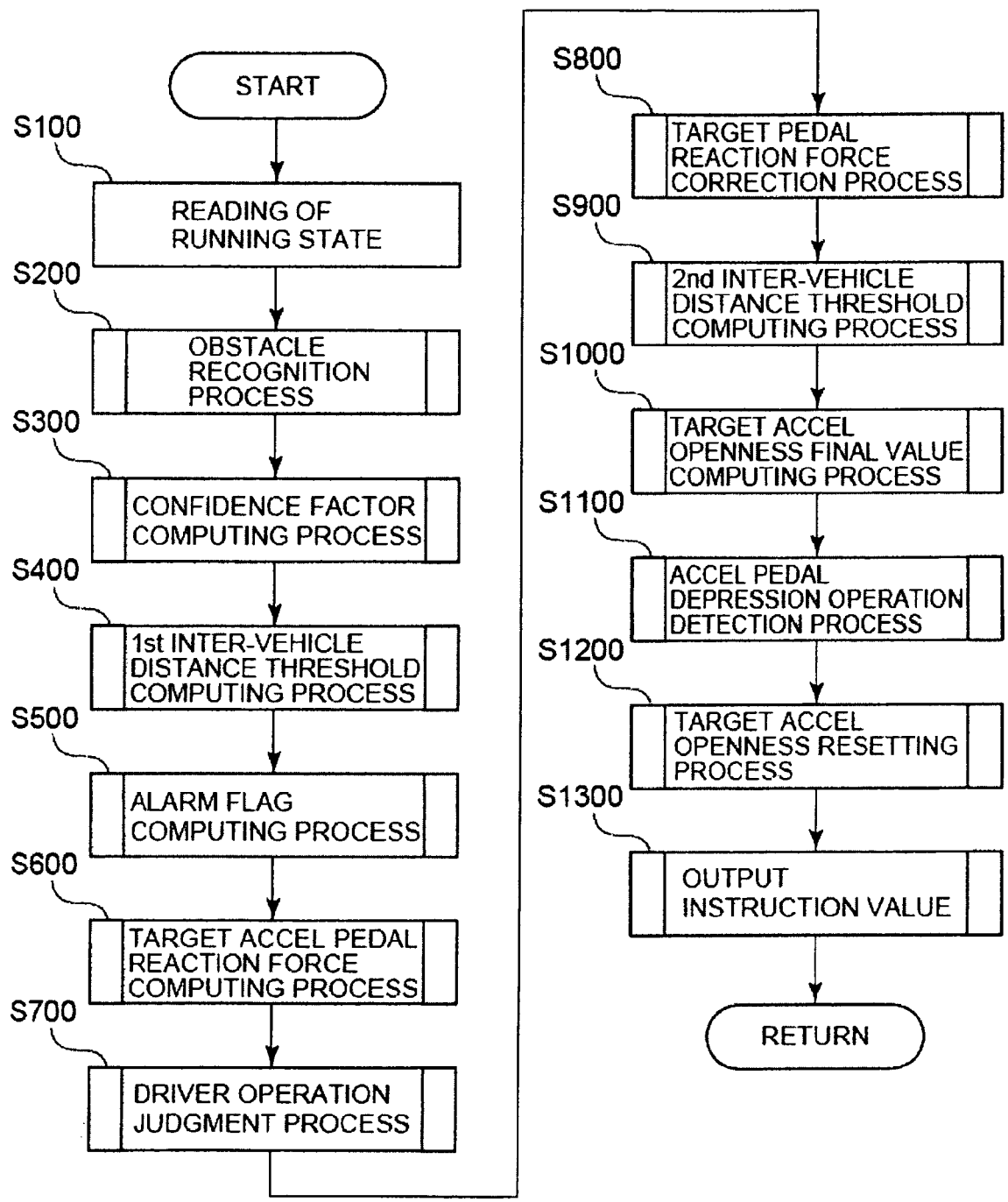
FIG. 4 is a flow chart illustrating the procedure of the inter-vehicle distance maintenance supporting control block in the inter-vehicle distance maintenance supporting system in an embodiment of the invention.

In the following, an explanation will be given in more detail regarding the operation of inter-vehicle distance maintenance supporting system 1 of Embodiment 1. FIG. 4 is a flow chart illustrating the procedure of the inter-vehicle distance maintenance control operation in controller 50 as an embodiment. This operation is performed consecutively once every prescribed interval, for example, 50 msec.

First, in step S100, the running state is read. Here, the running state refers to information pertaining to the running state of the host vehicle including the state of the obstacle ahead of the host vehicle. Here, the inter-vehicle distance to the obstacle ahead of the host vehicle and the direction of the obstacle ahead of the host vehicle, such as a preceding vehicle, detected by laser radar 10 and the host vehicle speed detected by vehicle speed sensor 20 are read.

In step S200, based on the running state data read and recognized in step S100, the state of the obstacle ahead of the host vehicle is recognized. Here, based on the relative position of the obstacle and its movement direction/movement speed with respect to the host vehicle detected in the preceding process cycle and before that and stored in the memory of controller 50 and the current running state obtained in step S100, the current relative position and its movement direction/movement speed of the obstacle with respect to the host vehicle are recognized. Then, it recognizes where the obstacle with respect to running of the host vehicle is set and how it moves in relation.

In step S300, as the value representing the confidence that the obstacle ahead of the host vehicle and as the object for the operation reaction force control and engine torque control will remain present as the control object ahead of the host vehicle, the confidence factor of the obstacle is computed. The confidence factor may also be taken as the value that represents the probability of the obstacle ahead of the host vehicle being present in the road to be traveled by the host vehicle (predicted running path).

The predicted running path can be predicted based on the yaw rate detected by yaw rate sensor 30 and the host vehicle speed detected by vehicle speed sensor 20. In this case, when the predicted running path is determined, filtering is performed for the yaw rate detected by yaw rate sensor 30 such that there is no variation in the predicted running path due to small variations in the yaw rate. This filter can be realized by, for example, a low-pass filter.

When heavy filtering is performed to remove noise and drift in the detected yaw rate, the response property slows. Consequently, for example, when the host vehicle changes lanes to pass the obstacle ahead of the host vehicle, the predicted running path determined based on the yaw rate cannot quickly respond to the motion of the host vehicle, especially turning of the steering wheel. As a result, it treats the obstacle ahead of the host vehicle to be passed as remaining in the predicted running path, so that the operation reaction force control and the engine torque control continues with the obstacle ahead of the host vehicle are taken as the object. As a result, the driver feels a braking-like discomfort when the host vehicle passes the obstacle ahead of the host vehicle.

According to Embodiment 1, when the driver depresses accelerator pedal 72 to pass the obstacle ahead of the host vehicle, the cutoff frequency in the filtering with respect to the yaw rate detected by yaw rate sensor 30 is corrected, and the mode changes to light filtering. As a result, a predicted running path that corresponds swiftly to the steering wheel operation by the driver is sought.

Figure 5:
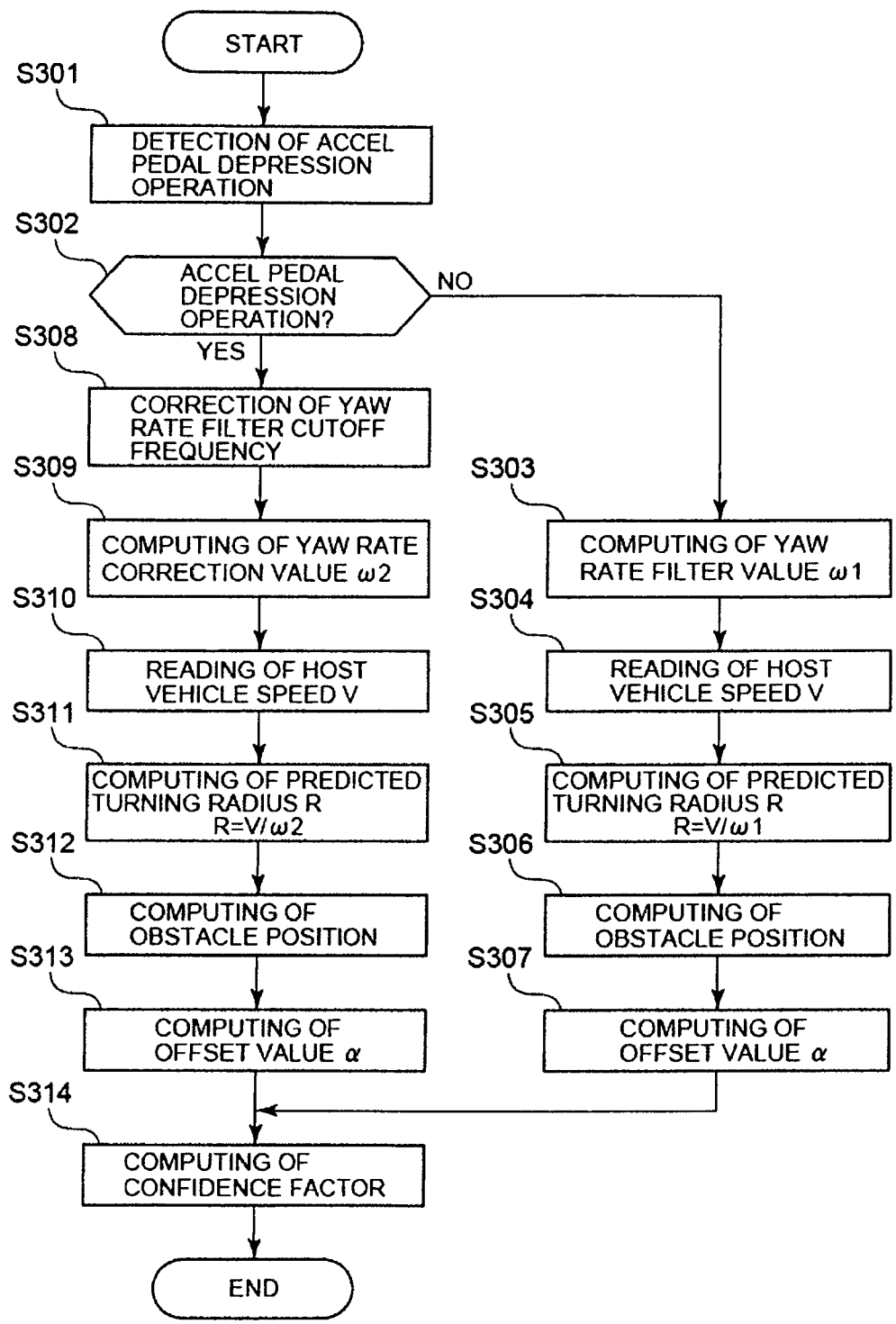
FIG. 5 is a flow chart illustrating the procedure for confidence factor computing.
Figure 6:
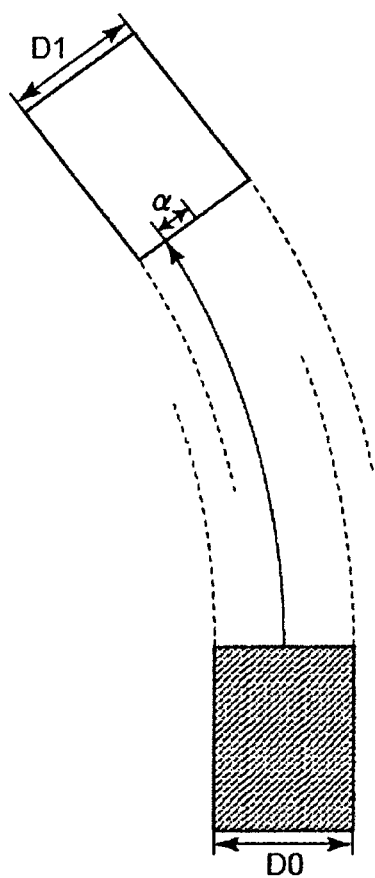
FIG. 6 is a diagram illustrating the method for computing the lateral offset value when the host vehicle travels on a curved road.

In the following, an explanation will be given regarding the treatment for computing the confidence factor in step S300 with reference to the flow chart shown in FIG. 5. FIG. 6 is a schematic diagram illustrating the relative positional relationship between the host vehicle and an obstacle when it appears ahead of the host vehicle while the host vehicle travels a curve in the road. As shown in FIG. 6, when deviation occurs in the lateral direction between the center of the host vehicle and the center of the obstacle, this lateral deviation is computed as offset value α and, from the computed lateral offset value α, the confidence factor is computed.

Figure 7:
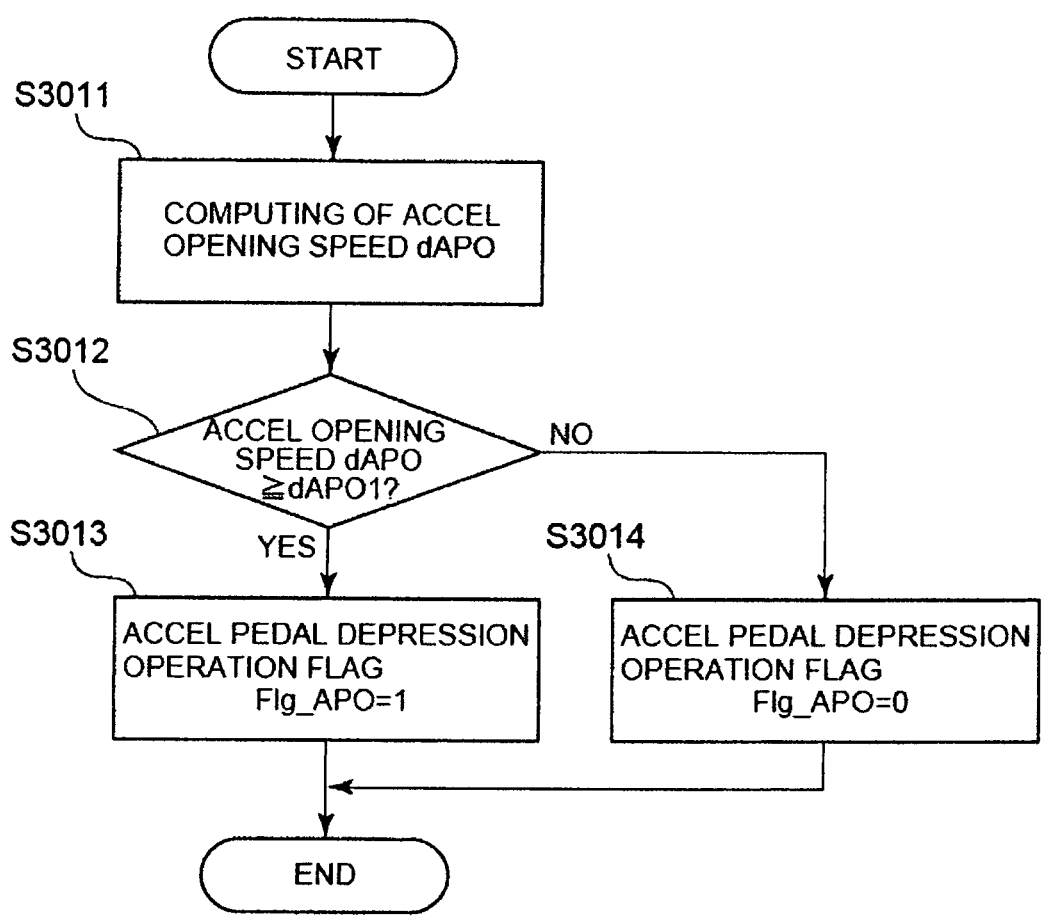
FIG. 7 is a flow chart illustrating the procedure for accelerator pedal depression detection.

First, in step S301, whether accelerator pedal 72 is depressed down is detected. In the following, an explanation will be given regarding this process with reference to the flow chart shown in FIG. 7. In step S3011, by performing differential computation for accelerator pedal depression amount APO by the driver detected by accelerator pedal depression amount detecting part 73, and the depression speed of accelerator pedal 72, that is, accelerator opening speed dAPO, is computed.

In step S3012, it is determined whether the accelerator opening speed dAPO exceeds a prescribed accelerator opening speed threshold dAPO1. When dAPO≥dAPO1, it is determined that the driver is depressing accelerator pedal 72, so that the process goes to step S3013 to set accelerator depression operation flag Flg_APO to 1. On the other hand, if dAPO<dAPO1, it is determined that the driver is not stepping down accelerator pedal 72, that is, accelerator pedal 72 is maintained or reset, or accelerator pedal 72 is released, so that the process goes to step S3014, and accelerator depression operation flag Flg_APO is set at 0, that is, it is cleared.

In step S302, it is determined whether accelerator pedal 72 is depressed down based on the result of detection of the accelerator pedal depression operation in step S301. When accelerator pedal 72 is depressed down (Flg_APO=1), the process goes to step S308. On the other hand, when accelerator pedal 72 is not depressed down (Flg_APO=0), the process goes to step S303.

In step S303, filtering is performed with respect to yaw rate ω detected by yaw rate sensor 30, and yaw rate filter value ω1 is computed. Here, yaw rate filter value ω1 can be computed using the following Formula 1 from cutoff frequency f1.

$$\omega 1 = \omega \times (2\pi f1)/(S+2\pi f1) \tag{Formula 1}$$

In Formula 1, S represents a Laplace operator.

In step 304, host vehicle speed V detected by vehicle speed sensor 20 is read. In step S305, the turning radius (predicted turning radius) R of the predicted running path is computed from yaw rate filter value ω1 computed in step S303 and host vehicle speed V read in step S304. The predicted turning radius R can be computed using the following Formula 2.

$$R = V/\omega 1 \tag{Formula 2}$$

Figure 8:
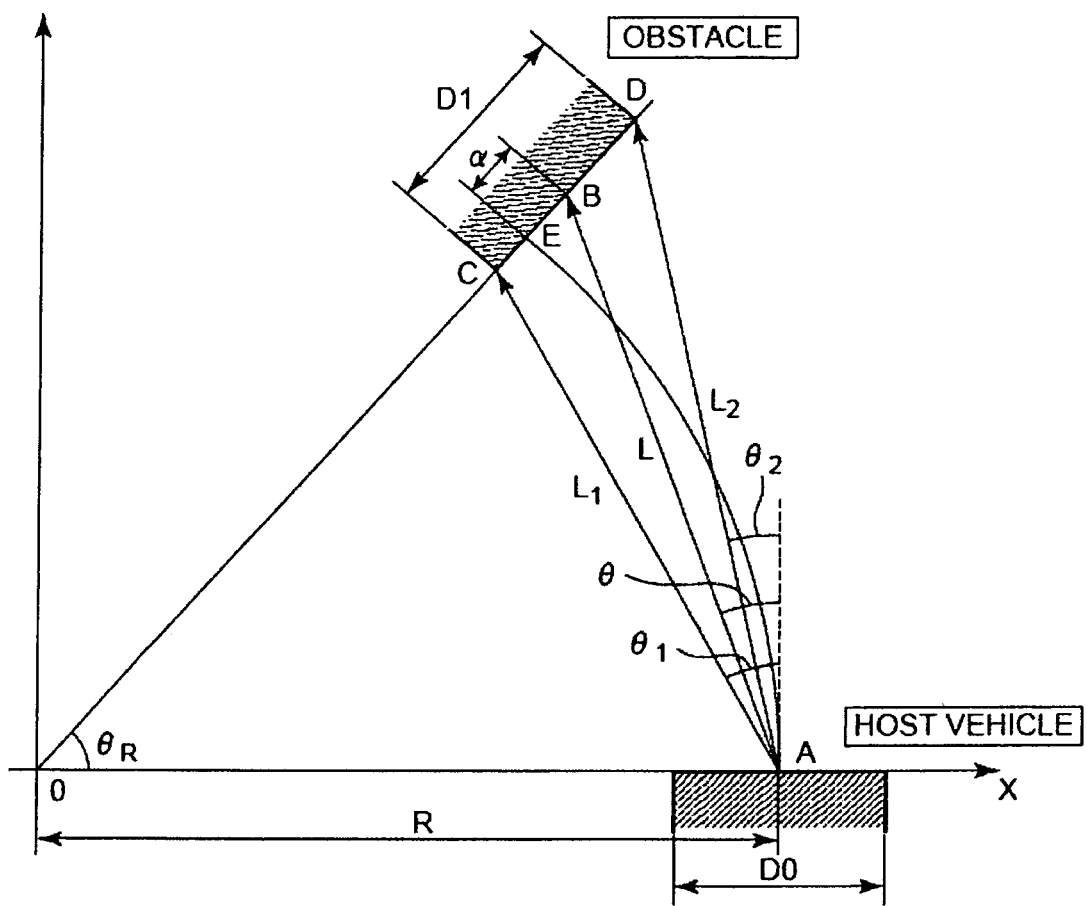
FIG. 8 is a diagram illustrating a method for computing the lateral offset value when the host vehicle travels on a curved road.

In step S306, the position of the obstacle ahead of the host vehicle is computed. As shown in FIG. 8, the position of the center of the curved road is taken as O, and the central angle between the host vehicle and the obstacle is taken as θR. Also, the position of the center of the host vehicle when the host vehicle reaches the current position of the obstacle is taken as E, and the distance between position E and obstacle center position B is taken as α. Also, R represents the turning radius of the curved road, and the predicted turning radius computed in step S305 is adopted as is.

In the following, an explanation will be given regarding the geometric method for determining lateral offset value α using distances L1, L2 and angles θ1, θ2 to the left/right edges of the obstacle, as well as host vehicle speed V. The various vectors in FIG. 8 are represented by the following Formulas 3-11.

$$\overrightarrow{OA} = \begin{pmatrix} R \\ 0 \end{pmatrix} \tag{Formula 3}$$

$$\overrightarrow{AB} = \begin{pmatrix} -L \cdot \sin\theta \\ L \cdot \cos\theta \end{pmatrix} \tag{Formula 4}$$

$$\overrightarrow{AC} = \begin{pmatrix} -L_1 \cdot \sin\theta_1 \\ L_1 \cdot \cos\theta_1 \end{pmatrix} \tag{Formula 5}$$

$$\overrightarrow{AD} = \begin{pmatrix} -L_2 \cdot \sin\theta_2 \\ L_2 \cdot \cos\theta_2 \end{pmatrix} \tag{Formula 6}$$

$$\overrightarrow{CB} = \begin{pmatrix} -L_2 \cdot \sin\theta_2 \\ L_2 \cdot \cos\theta_2 \end{pmatrix} \tag{Formula 7}$$

$$\overrightarrow{OE} = \begin{pmatrix} R \cdot \cos\theta_R \\ R \cdot \sin\theta_R \end{pmatrix} \tag{Formula 8}$$

$$\overrightarrow{CB} = \overrightarrow{AB} - \overrightarrow{AC} = \begin{pmatrix} -L \cdot \sin\theta + L_1 \cdot \sin\theta_1 \\ L \cdot \cos\theta - L_1 \cdot \cos\theta_1 \end{pmatrix} \tag{Formula 9}$$

$$\overrightarrow{BD} = \overrightarrow{AD} - \overrightarrow{AB} = \begin{pmatrix} -L_2 \cdot \sin\theta_2 + L \cdot \sin\theta \\ L_2 \cdot \cos\theta_2 - L \cdot \cos\theta \end{pmatrix} \tag{Formula 10}$$

$$\overrightarrow{OB} = \overrightarrow{OA} + \overrightarrow{AB} = \begin{pmatrix} R - L \cdot \sin\theta \\ L \cdot \cos\theta \end{pmatrix} \tag{Formula 11}$$

Also, obstacle width D1 can be computed using the following formula (Formula 12).

$$\therefore D_1^2 = L_1^2 + L_2^2 - 2L_1 \cdot L_2 \cos(\theta_1 - \theta_2)$$

$$\therefore D_1 = \sqrt{L_1^2 + L_2^2 - 2L_1 \cdot L_2 \cos(\theta_1 - \theta_2)} \tag{Formula 12}$$

Obstacle width D1 can be used to compute distance L to the center of the obstacle using Formula (13).

$$L_1^2 + L_2^2 = 2 \cdot \left(\left(\frac{D_1}{2}\right)^2 + L^2\right) \tag{Formula 13}$$

$$\therefore L = \sqrt{\frac{L_1^2 + L_2^2}{2} - \left(\frac{D_1}{2}\right)^2}$$

With regard to angle θ between obstacle center position B and the central line of the host vehicle in the longitudinal direction, because vector CB=vector BD, it can be represented by Formula 14.

$$\sin\theta = \frac{L_1 \cdot \sin\theta_1 + L_2 \cdot \sin\theta_2}{2L} \tag{Formula 14}$$

$$\cos\theta = \frac{L_1 \cdot \cos\theta_1 + L_2 \cdot \cos\theta_2}{2L}$$

Also, because vector OB and vector OE are parallel, the central angle θR between the host vehicle and the obstacle can be represented by Formula 15 below.

$$\tan\theta_R = \frac{L \cdot \cos\theta}{R - L \cdot \sin\theta} \tag{Formula 15}$$

In step S307, lateral offset value α between the host vehicle and the obstacle is computed. If the angle in the front-left direction of the host vehicle is positive, the offset value α can be computed by the following Formulas 16, 17.

When $\theta > 0$ (Formula 16)

$$\alpha = |\vec{EB}| = |\vec{OB} - \vec{OE}| = \left\| \begin{pmatrix} R - L \cdot \sin\theta - R \cdot \cos\theta_R \\ L \cdot \cos\theta - R \cdot \sin\theta_R \end{pmatrix} \right\|$$

When $\theta < 0$ (Formula 17)

$$\alpha = -|\vec{EB}| = -|\vec{OB} - \vec{OE}| = -\left\| \begin{pmatrix} R - L \cdot \sin\theta - R \cdot \cos\theta_R \\ L \cdot \cos\theta - R \cdot \sin\theta_R \end{pmatrix} \right\|$$

On the other hand, in step S302, if it is determined that accelerator pedal 72 is depressed, the process goes to step S308, and the cutoff frequency is corrected to change the filtering with respect to yaw rate ω detected by yaw rate sensor 30 to light filtering. Here, cutoff frequency correction value f' is set based on inter-vehicle distance L between the host vehicle and the obstacle ahead of the host vehicle. By correcting the cutoff frequency in this way, it is possible to correct the confidence factor, which is to be explained later.

Figure 9:
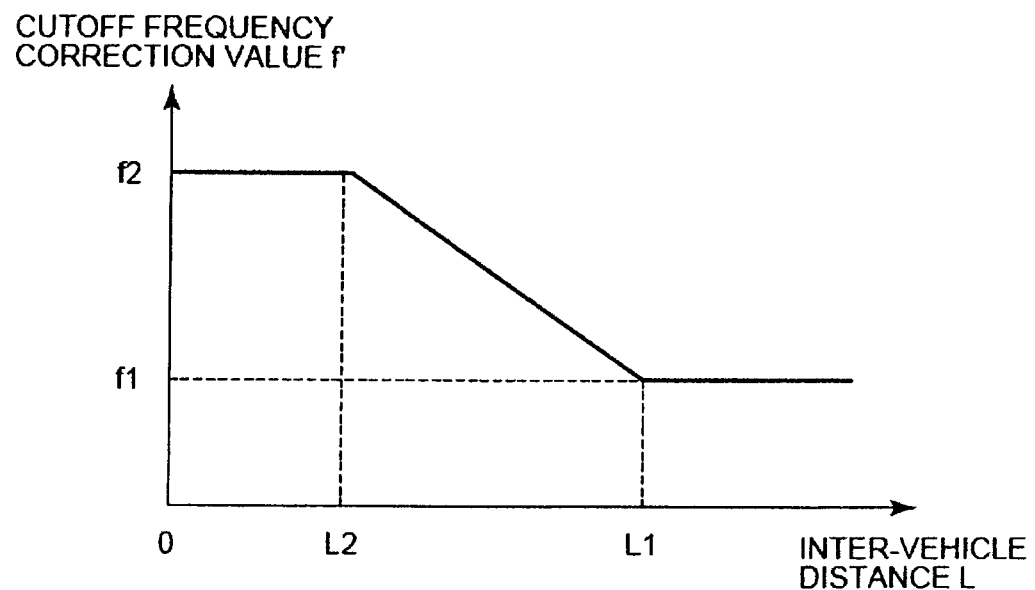
FIG. 9 is a diagram illustrating the relationship between the inter-vehicle distance and the cutoff frequency correction value.

FIG. 9 is a diagram illustrating the relationship between inter-vehicle distance L and cutoff frequency correction value f'. When inter-vehicle distance L is greater than prescribed inter-vehicle distance L1, cutoff frequency correction value f' is fixed at minimum value f1 to remove the noise and drift of the detected value of the yaw rate. Here, minimum value f1 refers to the cutoff frequency adopted in the filtering performed when accelerator pedal 72 is depressed down. When inter-vehicle distance L becomes less than prescribed inter-vehicle distance L1, cutoff frequency correction value f' is gradually increased. When inter-vehicle distance L becomes greater than prescribed inter-vehicle distance L2, cutoff frequency correction value f' is fixed at maximum value f2. As a result, if the driver tries to pass the obstacle ahead of the host vehicle so that the driver depresses accelerator pedal 72 to approach the obstacle ahead of the host vehicle, it is possible to detect the yaw rate with a high response.

In step S309, cutoff frequency correction value f' computed in step S308 is used to compute yaw rate correction value ω2 after filtering (yaw rate filter correction value). The yaw rate correction value ω2 is computed using the following Formula 18.

$$\omega 2 = \omega \times (2\pi f')/(S + 2\pi f')$$ (Formula 18)

In step S310, host vehicle speed V detected by vehicle speed sensor 20 is read. In step S311, predicted turning radius R is computed. Here, predicted turning radius R can be computed using the following Formula 19 from yaw rate correction value ω2 computed in step S309 and host vehicle speed V.

$$R = V/\omega 2$$ (Formula 19)

In step S312, Formulas 3-15 above are used to detect the position of the obstacle ahead of the host vehicle. In step S313, Formulas 16 and 17 above are used to compute lateral offset value α between the host vehicle and the obstacle.

Figure 10:
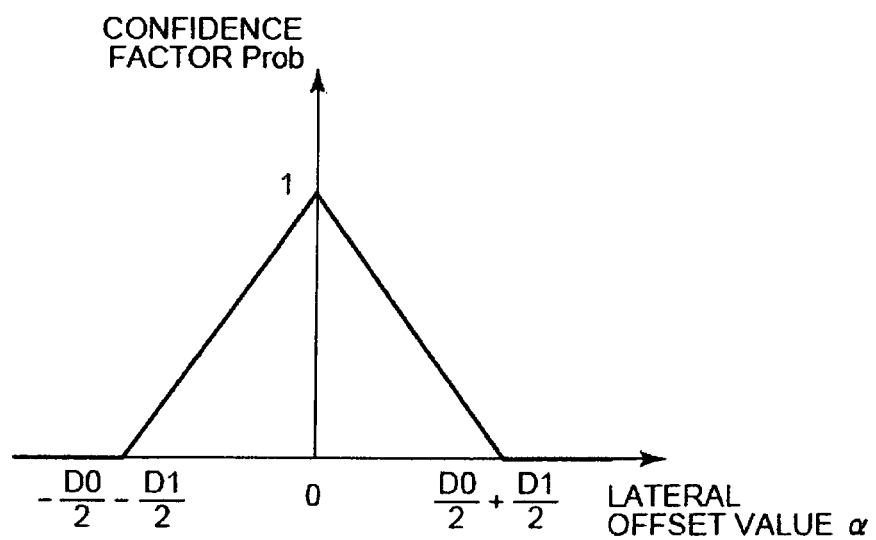
FIG. 10 is a diagram illustrating the lateral offset value and the confidence factor.

In step S314, lateral offset value α computed in step S307 or S313 is used to compute confidence factor Prob of the obstacle. FIG. 10 is a diagram illustrating the relationship between the lateral offset value α and confidence factor Prob.

As shown in FIG. 10, when lateral offset value α=0, that is, when host vehicle center position A and center position B of the obstacle ahead of the host vehicle are in agreement when the host vehicle reaches the position of the obstacle ahead, keeping the obstacle ahead of the host vehicle as the object for control is ensured, so that confidence factor Prob=1. That is, a higher confidence that the obstacle is present ahead of the host vehicle, means that a larger value is set for confidence factor Prob. A larger lateral offset value α, means higher that there is a possibility that the obstacle ahead of the host vehicle will not remain as an obstacle ahead of the host vehicle. In this case, confidence factor Prob that the current obstacle ahead of the host vehicle will remain to be an object for control is gradually reduced. When α>(D0/2+D1/2) or α<(D0/2−D1/2), the superposing amount between the host vehicle and the obstacle ahead of the host vehicle in the lateral direction disappears, and confidence factor Prob equals 0.

Figure 11:
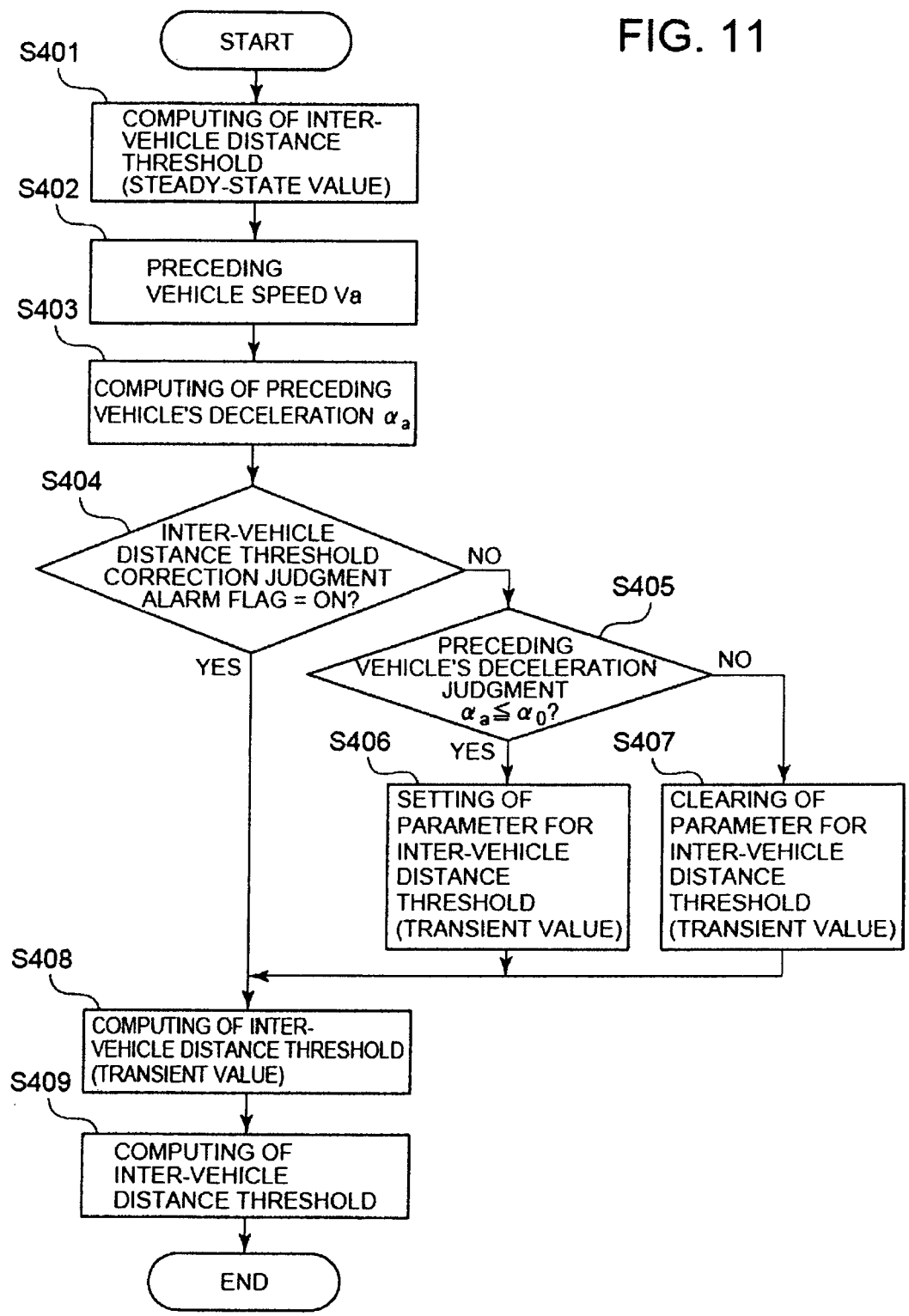
FIG. 11 is a flow chart illustrating the procedure for computing the first inter-vehicle distance threshold.

In this way, after confidence factor Prob of the obstacle is computed in step S300, the process goes to step S400. In step S400, the first inter-vehicle distance threshold with respect to the obstacle ahead of the host vehicle for use in the accelerator pedal reaction force control is computed. In the following, an explanation will be given regarding the operation carried out here with reference to the flow chart shown in FIG. 11.

In step S401, first, inter-vehicle distance threshold (steady-state value) Lh1* is computed. The inter-vehicle distance threshold (steady-state value) Lh1* corresponds to the inter-vehicle distance threshold when it is assumed that the vehicle speed of the obstacle, such as a preceding vehicle, is constant in the formula for computing the first inter-vehicle distance threshold for the obstacle ahead of the host vehicle. In this embodiment, inter-vehicle distance threshold (steady-state value) Lh1 is set to correspond to host vehicle speed VSP and relative speed Vr with the obstacle recognized in steps S100 and S200 (Lh1*=f(VSP, Vr)).

In step S402, preceding vehicle speed Va is computed using Formula 20 based on host vehicle speed VSP and relative speed Vr.

$$Va + VFSP + Vr$$ (Formula 20)

In step S403, the following Formula 21 is used to compute acceleration/deceleration αa of the preceding vehicle.

$$Aa = d(Va)/dt$$ (Formula 21)

In step S404, it is determined whether parameter Tr1 for inter-vehicle distance threshold (transient value) for computing inter-vehicle distance threshold (transient value) Lr1* is computed/refreshed. As the condition for computing/refreshing the parameter Tr1 for the inter-vehicle distance threshold (transient value), it is determined whether alarm flag Fw computed in step S500 to be explained later is set. If the alarm flag is not set (Fw=OFF), the process goes to step S405. On the other hand, if the alarm flag is set (Fw=ON), the process goes to step S408 without refreshing parameter Tr1 for the inter-vehicle distance threshold (transient value).

In step S405, it is determined whether the preceding vehicle is decelerating. In this embodiment, it is determined whether acceleration/deceleration αa of the preceding vehicle computed in step S403 exceeds a prescribed level. If the acceleration/deceleration αa of the preceding vehicle is less than prescribed level α0 (αa≤α0), it is determined that the preceding vehicle is decelerating, so that preceding vehicle deceleration judgment flag Fdec_a=ON. Then, the process goes to step S406. On the other hand, when acceleration/deceleration αa of the preceding vehicle exceeds the prescribed level α0 (αa>α0), the preceding vehicle deceleration judgment flag Fdec_a=OFF, and the process goes to step S407. Here, prescribed level α0 is a threshold for judging whether the preceding vehicle is decelerating, and it is preset to an appropriate value. Here, the acceleration/deceleration αa of the preceding vehicle and deceleration judgment threshold α0 are taken to have positive values in acceleration, and negative values in deceleration.

In step S406, when it is determined that the preceding vehicle is decelerating, the following formula (Formula 22) is used to compute and refresh parameter Tr1 for the inter-vehicle distance threshold (transient value).

$$Tr_1 = \frac{(L - L_{h1}^*)}{Vr} \quad \text{(Formula 22)}$$

As can be seen from Formula 22, the parameter Tr1 for the inter-vehicle distance threshold (transient value) represents the portion (L−Lh1*) corresponding to the tolerable distance of real inter-vehicle distance L with respect to inter-vehicle distance threshold (steady-state value) Lh1* when the preceding vehicle starts decelerating at a relative speed coefficient.

In step S407, when it is determined that the preceding vehicle is not decelerating, parameter Tr1 for the inter-vehicle distance threshold (transient value) is cleared (Tr1=0).

In step S408, the following formula (Formula 23) is used to compute inter-vehicle distance threshold (transient value) Lr1*.

$$Lr1^* = Tr1 \times Vr \quad \text{(Formula 23)}$$

Here, inter-vehicle distance threshold (transient value) Lr1* corresponds to the inter-vehicle distance threshold when it is assumed that the obstacle ahead of the host vehicle, such as a preceding vehicle, is decelerating in the formula for computing the first inter-vehicle distance threshold.

In step S409, first inter-vehicle distance threshold L1* is computed using inter-vehicle distance threshold (steady-state value) Lh1* computed in step S401 and the inter-vehicle distance threshold computed in step S408. In this embodiment, the following formula (Formula 24) is used to compute first inter-vehicle distance threshold L1* as the sum of the inter-vehicle distance threshold (steady-state value) Lh1* and the inter-vehicle distance threshold (transient value) Lr1*.

$$L1^* = Lh1^* + Lr1^* \quad \text{(Formula 24)}$$

After computing of first inter-vehicle distance threshold L1* in step S400, the process goes to step S500. In step S500, the alarm flag Fw is computed. More specifically, the alarm flag Fw is determined using actual inter-vehicle distance L between the host vehicle and the preceding vehicle read in step S100 and first inter-vehicle distance threshold, L1* computed in step S400. When the actual inter-vehicle distance L is less than first inter-vehicle distance threshold L1* (L1*>L), the alarm flag Fw=ON. On the other hand, if actual inter-vehicle distance L is greater than the first inter-vehicle distance threshold L1* (L*1≤L), alarm flag Fw=OFF.

Then, in step S600, based on the first inter-vehicle distance threshold L1*, target accelerator pedal reaction force FA* for applying on accelerator pedal 72 is determined. In order to compute target accelerator pedal reaction force FA*, first, difference (deviation in inter-vehicle distance) ΔL1 between first inter-vehicle distance threshold L1* and actual inter-vehicle distance L is computed using the following formula (Formula 25).

$$\Delta L1 = L1^* - 1 \quad \text{(Formula 25)}$$

Then, from first inter-vehicle distance threshold L1* and inter-vehicle distance deviation ΔL1, Formula 26 is used to compute target accelerator pedal reaction force FA*.

$$FA^* = Kp \times \Delta L1 \quad \text{(Formula 26)}$$

Figure 12:
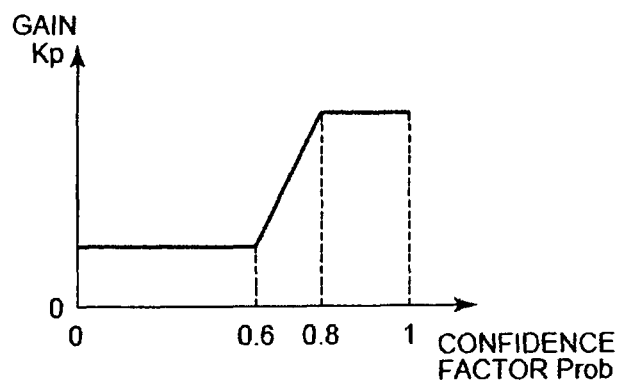
FIG. 12 is a diagram illustrating the relationship between the confidence factor and gain Kp.

In Formula 26, Kp represents the gain for computing target accelerator pedal reaction force FA* from inter-vehicle distance deviation ΔL1, and it is set based on confidence factor Prob of the obstacle computed in step S300. FIG. 12 is a diagram illustrating the relationship between confidence factor Prob and gain Kp. As shown in FIG. 12, a smaller confidence factor Prob, means lower a gain Kp. Here, target accelerator pedal reaction force FA* is computed such that it is larger when actual inter-vehicle distance L decreases with respect to first inter-vehicle distance threshold L1*, and it is smaller when gain Kp computed based on confidence factor Prob is less. When an obstacle is present right ahead of the host vehicle, confidence factor Prob=1. On the other hand, when the host vehicle and the obstacle superpose each other by about half, confidence factor Prob=0.8. Also, for example, when the right end of the host vehicle and the left end of the obstacle agree, confidence factor Prob=0.6.

Figure 13:
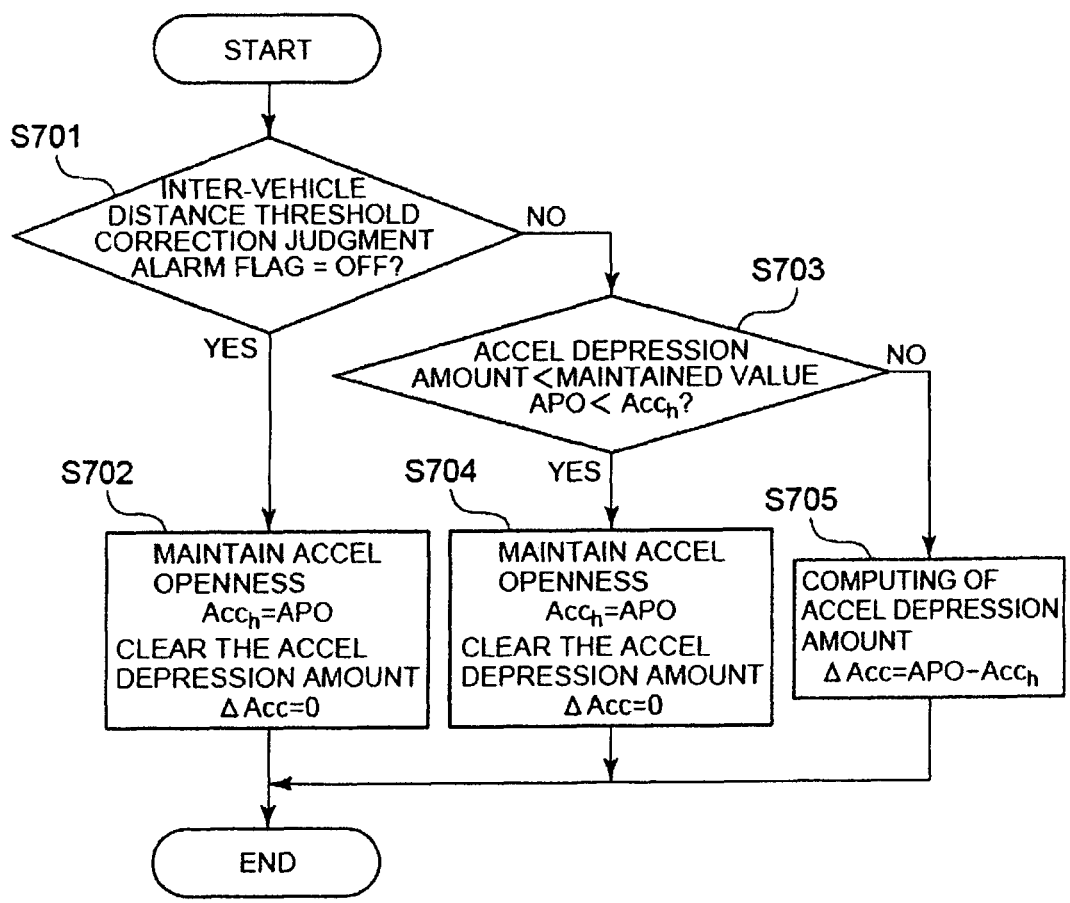
FIG. 13 is a flow chart illustrating the procedure for driver operation judgment.

In this way, target accelerator pedal reaction force FA* is computed in step S600. Then, the process goes to step S700. In step S700, it is determined whether the operator has further depressed accelerator pedal 72. In the following, an explanation will be given regarding the operation carried out in this case with reference to the flow chart shown in FIG. 13.

In step S701, as the condition for refreshing accelerator opening retention value Acch, it is determined whether alarm flag Fw computed in step S500 is set. When alarm flag Fw is not set (Fw=OFF), the process goes to step S702. On the other hand, when alarm flag Fw is set (Fw=ON), the process goes to step S703.

In step S702, accelerator pedal depression amount APO of accelerator pedal 72 by the driver depresses the pedal and detected by accelerator pedal depression amount detecting part 73 is set as accelerator opening retention value Acch. Then, accelerator depression increment ΔAcc of accelerator pedal 72 is cleared (ΔAcc=0). Here, accelerator depression increment ΔAcc indicates whether accelerator pedal 72 is further depressed from the accelerator opening retention value Acch, that is, whether the accelerator pedal is further depressed down.

In step S703, it is determined whether accelerator pedal depression amount APO detected by accelerator pedal depression amount detecting part 73 is less than accelerator opening retention value Acch. When accelerator pedal depression amount APO is less than accelerator opening retention value Acch, the process goes to step S704. On the other hand, if accelerator pedal depression amount APO is greater than accelerator opening retention value Acch, the process goes to step S705.

In step S704, while accelerator pedal depression amount APO detected by accelerator pedal depression amount detecting part 73 is set as accelerator opening retention value Acch, accelerator depression increment ΔAcc is cleared (ΔAcc=0). On the other hand, in step S705, accelerator depression increment ΔAcc is computed using the following formula (Formula 27) from accelerator pedal depression amount APO and accelerator opening retention value Acch.

$$\Delta Acc = APO - Acch \quad \text{(Formula 27)}$$

Figure 14:
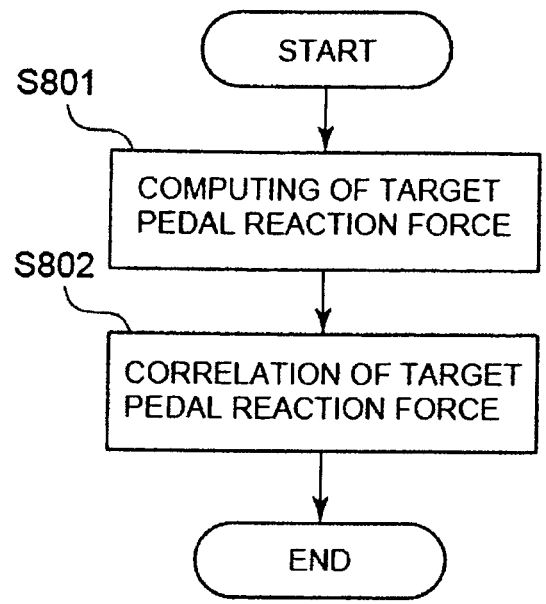
FIG. 14 is a flow chart illustrating the procedure for target pedal reaction force correction.

In this way, after determination of driver action in step S700, that is, after determination of whether the driver has depressed down accelerator pedal 72, the process goes to step S800. In step S800, based on depression by the driver determined in step S700, target accelerator pedal reaction force FA* computed in step S600 is corrected. In the following, an explanation will be given regarding the operation carried out here with reference to the flow chart shown in FIG. 14.

First, in step S801, based on accelerator depression increment ΔAcc computed in step S700, target pedal reaction force correction coefficient K_fa for correcting target accelerator pedal reaction force FA* is computed according to the following formula (Formula 28).

$$K\_fa = 100 - (\Delta Acc \times Kacc) \quad \text{(Formula 28)}$$

Figure 15:
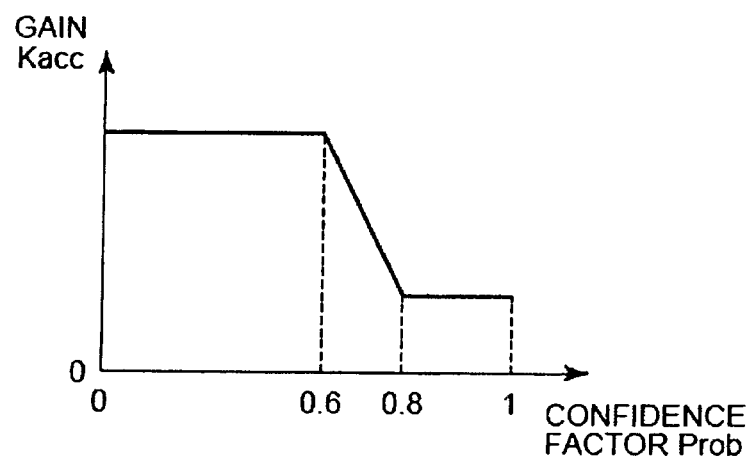
FIG. 15 is a diagram illustrating the relationship between the confidence factor and gain Kacc.

Here, Kacc is the gain for computing target pedal reaction force correction coefficient K_fa from accelerator depression increment ΔAcc, and it is set based on confidence factor Prob of the obstacle computed in step S300. FIG. 15 is a diagram illustrating the relationship between confidence factor Prob and gain Kacc. As shown in FIG. 15, when confidence factor Prob approaches one, gain Kacc is set to the minimum value, such as the smaller confidence factor Prob results in a higher gain Kacc. Here, the maximum value of target pedal reaction force correction coefficient K_fa is 100, and the minimum is 0.

In step S802, target accelerator pedal reaction force correction value FA*corr is computed by means of the following formula (Formula 29) from target pedal reaction force correction coefficient K_fa computed in step S801 and target accelerator pedal reaction force FA* computed in step S600.

$$FA*corr = K\_fa \times FA*/100 \quad \text{(Formula 29)}$$

Consequently, a smaller confidence factor Prob results in a larger gain Kacc, and larger correction amount of target accelerator pedal reaction force FA* with respect to accelerator depression increment ΔAcc. That is, in this case, target accelerator pedal reaction force correction value FA*corr decreases and accelerator pedal 72 can be depressed down more easily. Also, a larger accelerator depression increment ΔAcc results in a smaller target pedal reaction force correction coefficient K_fa, and smaller the target accelerator pedal reaction force correction value FA*corr.

Figure 16:
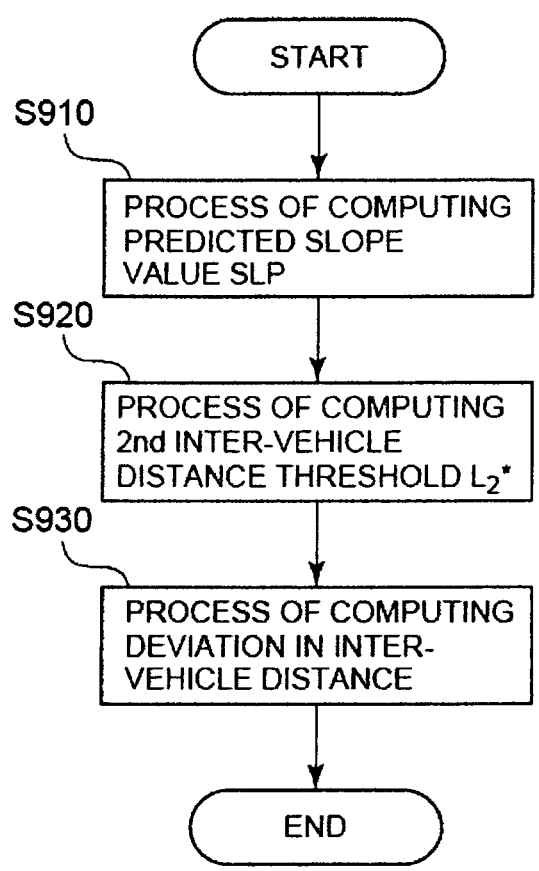
FIG. 16 is a flow chart illustrating the procedure for computing the second inter-vehicle distance threshold.

In this way, after target accelerator pedal reaction force correction value FA*corr is computed in step S800, the process goes to step S900. In step S900, the second inter-vehicle distance threshold for the obstacle for the engine torque control is computed. In the following, an explanation will be given in more detail regarding the computing of the second inter-vehicle distance threshold with reference to the flow chart shown in FIG. 16.

In step S910, the slope of the road the host vehicle is traveling is determined. First, if the torque amplification rate of the engine torque converter is Rt, the automatic transmission gear ratio is Rat, and the differential gear ratio is Rdef, the relationship between driving shaft torque Tw and engine torque Te can be represented by the following formula (Formula 3).

$$Tw = Rt \times Rat \times Rdef \times Te \quad \text{(Formula 30)}$$

Also, if the brake cylinder area is Ab, the rotor effective radius is Rb, and the pad frictional coefficient is μb, the relationship between brake hydraulic pressure instruction value Pbr and brake torque Tbr is represented by the following formula (Formula 31).

$$Tbr = 8 \times Ab \times Rb \times \mu b \times Pbr \quad \text{(Formula 31)}$$

In addition, aerodynamic resistance Fa and rotary resistance Fr acting on the host vehicle can be computed using the following formulas 32 and 33, respectively.

$$Fa = \mu a \times Sv \times VSP^2 \quad \text{(Formula 32)}$$

$$Fr = \mu r \times Mv \times g \quad \text{(Formula 33)}$$

Here, μa represents the aerodynamic resistivity, Sv represents the front projection area, μr represents the rotary resistivity, Mv represents weight of the vehicle, g represents the acceleration of gravity, and VSP represents the host vehicle speed.

From driving shaft torque Tw generated by the engine torque and the brake hydraulic pressure, aerodynamic resistance Fa and rotary resistance Fr computed using the above Formulas 30-33, the acceleration of the host vehicle is determined and compared with the actual acceleration, so that slope SLP of the road the host vehicle is traveling can be determined using the following formula (Formula 34).

$$SLP = \frac{T_w - T_{br} - R_w(F_a + F_r)}{M_v R_w} - s \cdot VSP \quad \text{(Formula 34)}$$

Here, s represents a Laplace operator, and Rw represents the coefficient used in computing the slope.

Figure 17:
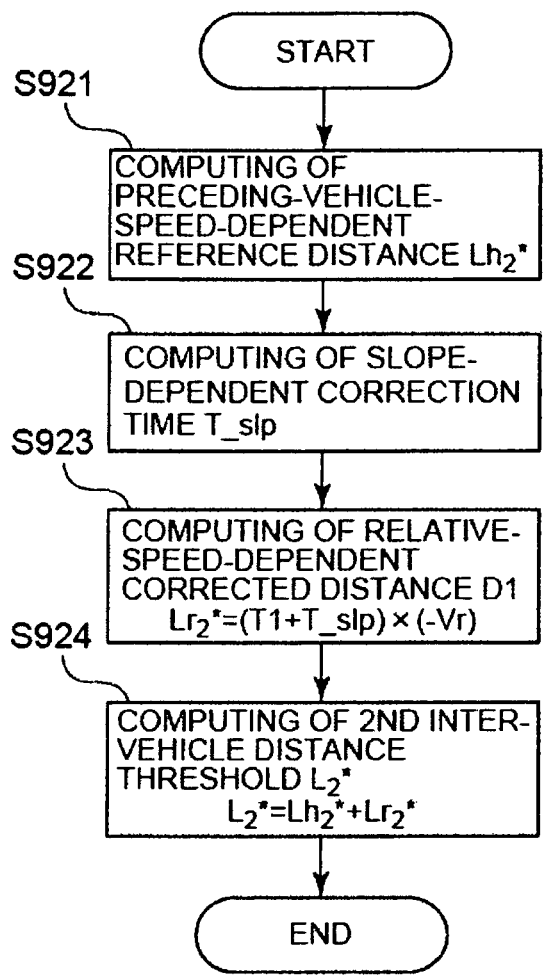
FIG. 17 is a flow chart further illustrating the procedure for computing the second inter-vehicle distance threshold.

In step S920, second inter-vehicle distance threshold L2* with respect to the obstacle ahead of the host vehicle is computed. In the following, an explanation will be given in more detail regarding computing of the second inter-vehicle distance threshold performed in step S920 with reference to the flow chart shown in FIG. 17.

Figure 18:
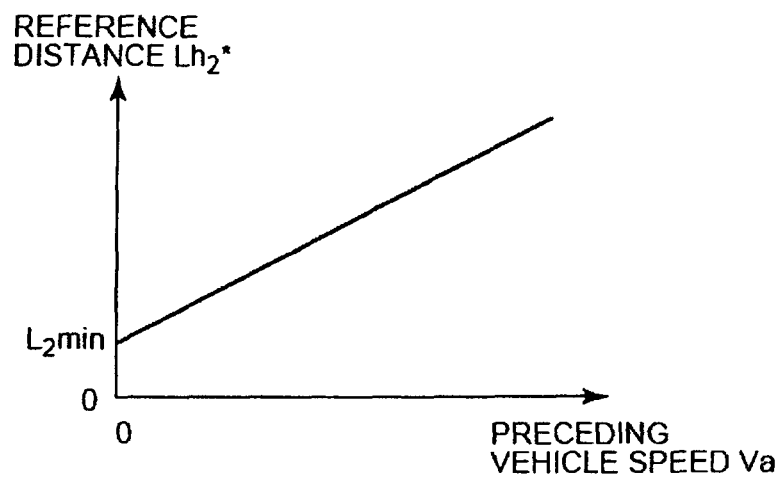
FIG. 18 is a diagram illustrating the relationship between the preceding vehicle speed and the preceding-vehicle-speed-dependent reference distance.

First of all, in step S921, based on preceding vehicle speed Va, preceding-vehicle-speed-dependent reference distance Lh2* is computed. FIG. 18 is a diagram illustrating the relationship between preceding vehicle speed Va and preceding-vehicle-speed-dependent reference distance Lh2*. As shown in FIG. 18, the preceding-vehicle-speed-dependent reference distance Lh2* is set such that it is increased slowly from minimum value L2min so that a higher preceding vehicle speed Va means a farther distance at which the output amount of the engine torque with respect to accelerator pedal depression amount APO is controlled.

Figure 19:
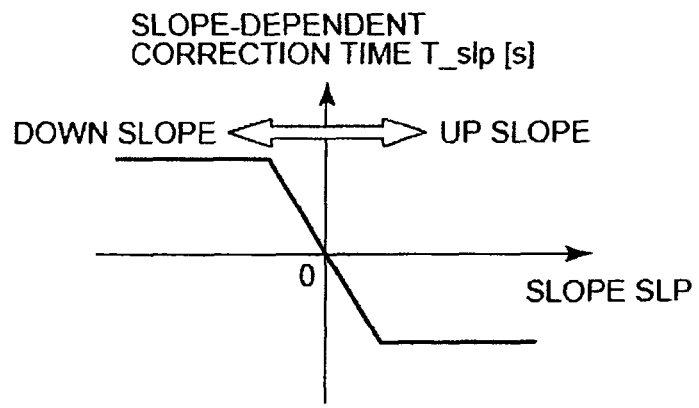
FIG. 19 is a diagram illustrating the relationship between the slope of the road the host vehicle is traveling on and the slope-dependent correction time.

In step S922, slope-dependent correction time T_slp is computed based on slope SLP of the road the host vehicle is traveling. FIG. 19 is a diagram illustrating the relationship between slope SLP and slope-dependent correction time T_slp. As shown in FIG. 19, when slope SLP is positive, that is, when the vehicle travels up a slope, slope-dependent correction time T_slp is set to a negative value. On the other hand, when the slope SLP is negative, that is, when the vehicle travels down a slope, slope-dependent correction time T_slp is set to a positive value, such that a larger absolute value of the slope SLP means a larger absolute value of slope-dependent correction time T_slp. Also, when the absolute value of slope SLP exceeds a prescribed level, the absolute value of slope-dependent correction time T_slp is fixed at a prescribed value.

In step S923, relative-speed-dependent correction distance Lr2* is computed. From the preset reference time T1 and slope-dependent correction time T_slp computed in step S922, relative-speed-dependent correction distance Lr2* is computed using the following formula (Formula 35).

$$Lr2* = (T1 + T\_slp) \times (-Vr) \quad \text{(Formula 35)}$$

In step S924, second inter-vehicle distance threshold L2* is computed. From preceding-vehicle-speed-dependent reference distance Lh2* computed in step S921 and relative-speed-dependent correction distance Lr2* computed in step S923, second inter-vehicle distance threshold L2* is computed using the following formula (Formula 36).

$$L2* = Lh2* + Lr2* \quad \text{(Formula 36)}$$

Figure 20:
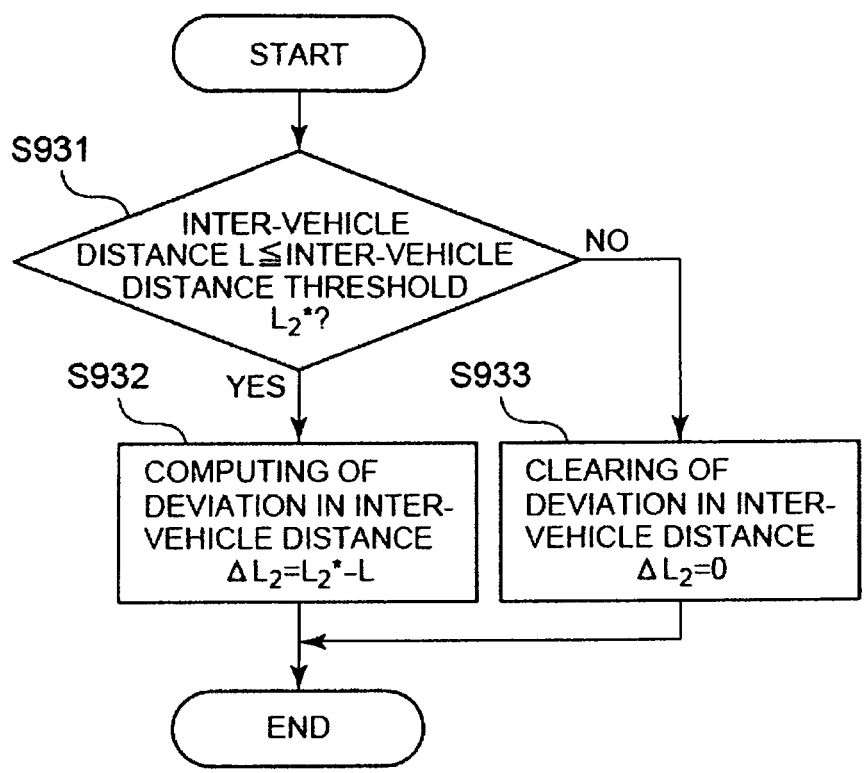
FIG. 20 is a flow chart illustrating the procedure for computing the deviation in inter-vehicle distance.

After second inter-vehicle distance threshold L2* is computed in step S920, in step S930, inter-vehicle distance deviation ΔL2 is computed from actual inter-vehicle distance L and second inter-vehicle distance threshold L2*. In the following, an explanation will be given regarding the operation carried out here with reference to the flow chart shown in FIG. 20.

In step S931, it is determined whether the actual inter-vehicle distance L between the host vehicle and the obstacle ahead of the host vehicle detected by laser radar 10 is less than second inter-vehicle distance threshold L2* computed in step S920. If L≤L2*, the process goes to step S932, and inter-vehicle distance deviation ΔL2 is computed according to the following formula (Formula 37).

$$\Delta L2 = L2^* - L \quad \text{(Formula 37)}$$

When it is determined that L>L2* in step S931, the process goes to step S933, and inter-vehicle distance deviation ΔL2 is set to 0, that is, it is cleared.

Figure 21:
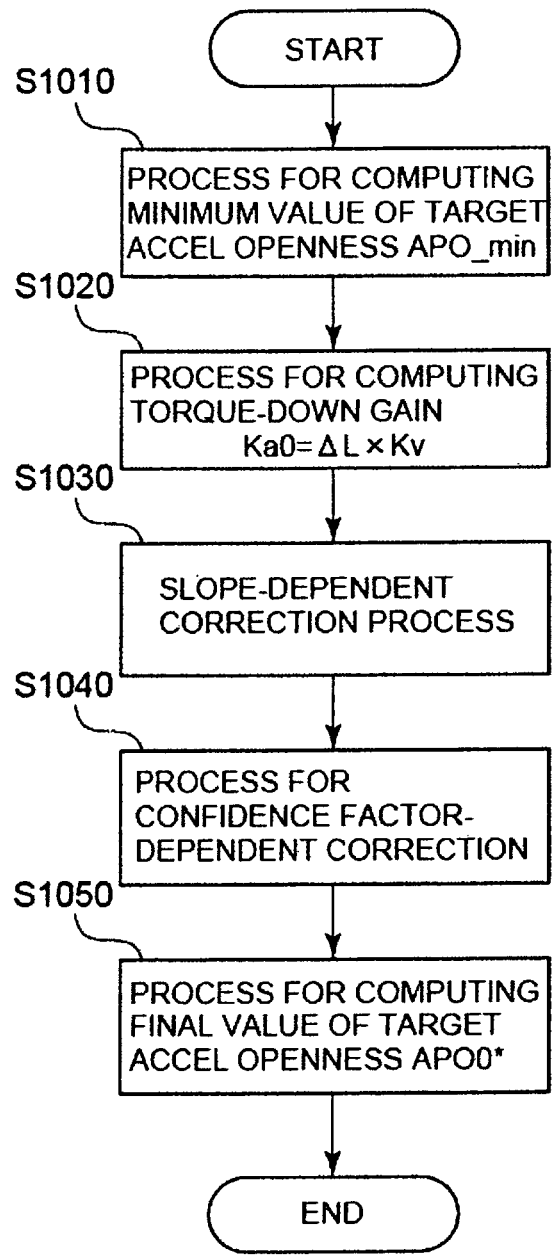
FIG. 21 is a flow chart illustrating the procedure for computing the final value of the target accelerator opening.

In this way, after computing the second inter-vehicle distance threshold in step S900, the process goes to step S1000. In step S1000, from second inter-vehicle distance threshold L2* computed in step S900 as well as inter-vehicle distance deviation ΔL2, target accelerator pedal opening final value APO0* for controlling the output amount of the engine torque with respect to accelerator pedal depression amount APO by the driver is computed. In the following, an explanation will be given in more detail regarding the treatment for computing the final value of the target accelerator opening carried out in step S1000 with reference to the flow chart shown in FIG. 21.

Figure 22:
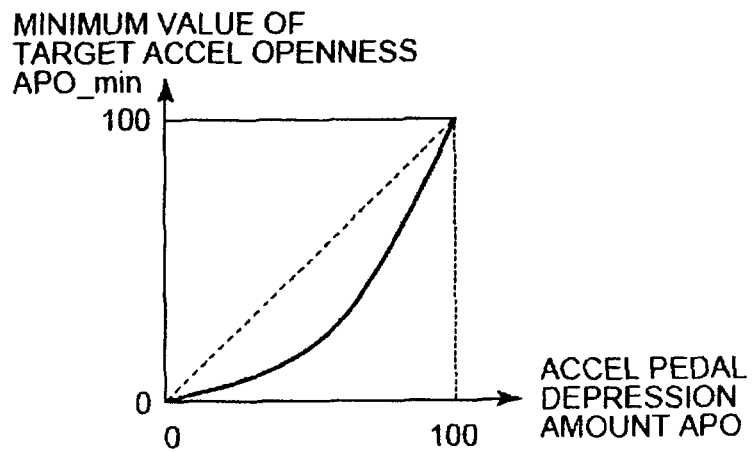
FIG. 22 is a diagram illustrating the relationship between the accelerator pedal depression amount and the target accelerator opening minimum value.

First, in step S1010, target accelerator opening minimum value APO_min with respect to accelerator pedal depression amount APO is computed. FIG. 22 is a diagram illustrating the relationship between accelerator pedal depression amount APO and target accelerator opening minimum value APO_min. As indicated by the solid line in FIG. 22, the target accelerator opening minimum value APO_min is set such that it is determined uniquely with respect to accelerator pedal depression amount APO; a larger accelerator pedal depression amount APO means a larger target accelerator opening minimum value APO_min.

In step S1020, torque down gain Ka0 is computed using the following formula (Formula 38) from vehicle-speed-dependent gain $K_v$ and inter-vehicle distance deviation ΔL2 computed in step S930 and inter-vehicle distance deviation ΔL2.

$$Ka0 = 100 - \Delta L2 \times Kv \quad \text{(Formula 38)}$$

Figure 23:
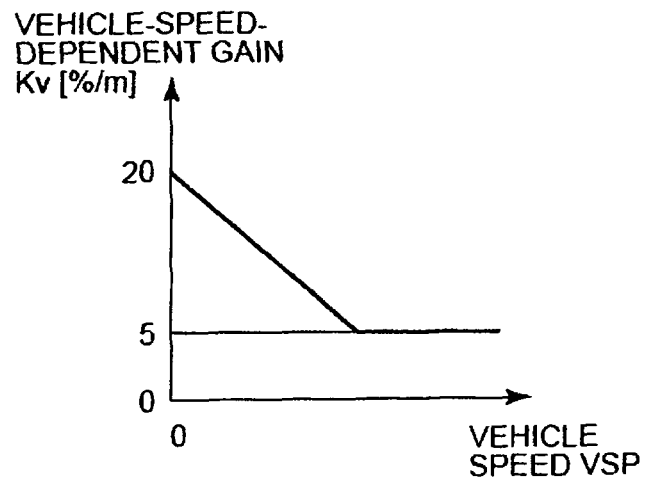
FIG. 23 is a diagram illustrating the relationship between the vehicle speed and the vehicle-speed-dependent gain.

Here, vehicle-speed-dependent gain Kv is the amount of change of torque down gain Ka0 with respect to inter-vehicle distance deviation ΔL2, and it is computed from the plot shown in FIG. 23. As shown in FIG. 23, as host vehicle speed VSP increases, the vehicle-speed-dependent gain Kv gradually decreases, so that the amount of change of torque down gain Ka0 with respect to inter-vehicle distance deviation ΔL2 is decreased. When host vehicle speed VSP exceeds a prescribed level, vehicle-speed-dependent gain Kv is fixed at a prescribed value.

Figure 24:
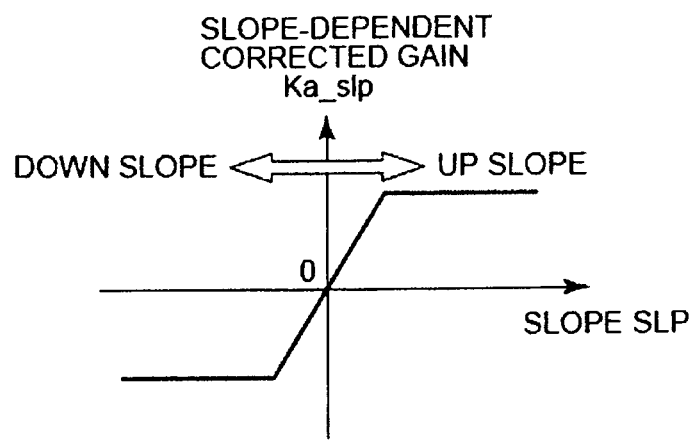
FIG. 24 is a diagram illustrating the relationship between the slope of the road the host vehicle is traveling on and the slope-dependent corrected gain.

In step S1030, torque down gain Ka0 computed in step S1020 is corrected corresponding to slope SLP of the road the host vehicle is traveling. First, from the plot shown in FIG. 24, slope-dependent corrected gain Ka_slp is computed. When the slope SLP is positive, that is, when the vehicle travels up a slope, slope-dependent corrected gain Ka_slp is set to a positive value. On the contrary, when slope SLP is negative, that is, when the vehicle travels down a slope, slope-dependent corrected gain Ka_slp is set to a negative value. A larger absolute value of slope SLP means a larger absolute value of slope-dependent corrected gain Ka_slp. Also, when the absolute value of slope SLP exceeds a prescribed level, the absolute value of slope-dependent corrected gain Ka_slp is fixed at a prescribed value.

By means of slope-dependent corrected gain Ka_slp computed based on slope SLP of the road the host vehicle is traveling, torque down gain Ka0 computed in step S1020 is corrected, and torque down gain Ka1 is re-computed. The torque down gain Ka1 is computed using the following formula (Formula 39).

$$Ka1 = Ka0 + K\_slp \quad \text{(Formula 39)}$$

Here, torque down gain Ka1 has a maximum value of 100 and minimum value of 0.

Figure 25:
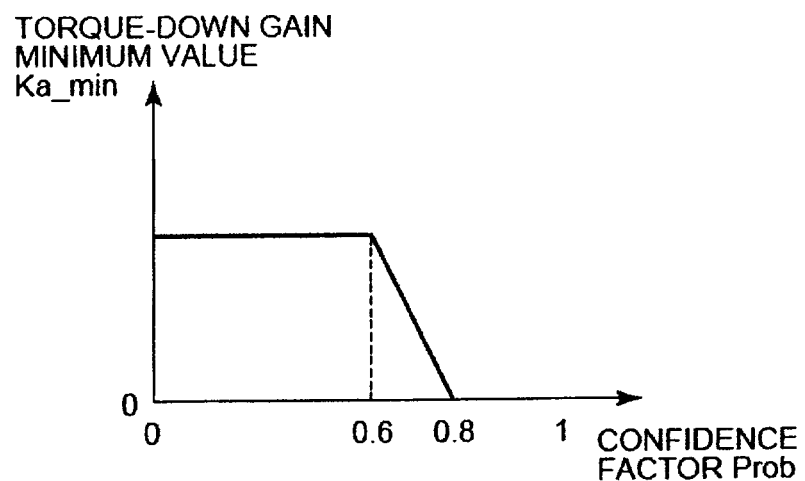
FIG. 25 is a diagram illustrating the relationship between the confidence factor and the minimum value of the torque down gain.

In step S1040, based on confidence factor Prob computed in step S300, torque down gain Ka1 computed in step S1030 is corrected. First, from the plot shown in FIG. 25, torque down gain minimum value Ka_min is computed corresponding to confidence factor Prob. As shown in FIG. 25, a smaller confidence factor Prob of the obstacle means a larger torque down gain minimum value Ka_min. By restricting torque down gain Ka1 computed in step S1030 using torque down gain minimum value Ka_min computed based on confidence factor Prob, final torque down gain Ka is computed. More specifically, by means of select a high torque down gain Ka1 and torque down gain minimum value Ka_min as shown in the following (Formula 40), torque down gain Ka is computed.

$$Ka = \max(Ka1, Ka\_min) \quad \text{(Formula 40)}$$

In step S1050, target accelerator pedal opening final value APO0* is computed. As shown in the following formula (Formula 41), target accelerator pedal opening final value APO0* is computed by interior-dividing target accelerator opening minimum value APO_min computed in step S1010 and accelerator pedal depression amount APO of the driver in torque down gain Ka computed in step S1040.

$$APO0^* = APO \cdot \frac{Ka}{100} + APO\_min \cdot \frac{100 - Ka}{100} \quad \text{(Formula 41)}$$

Figure 26:
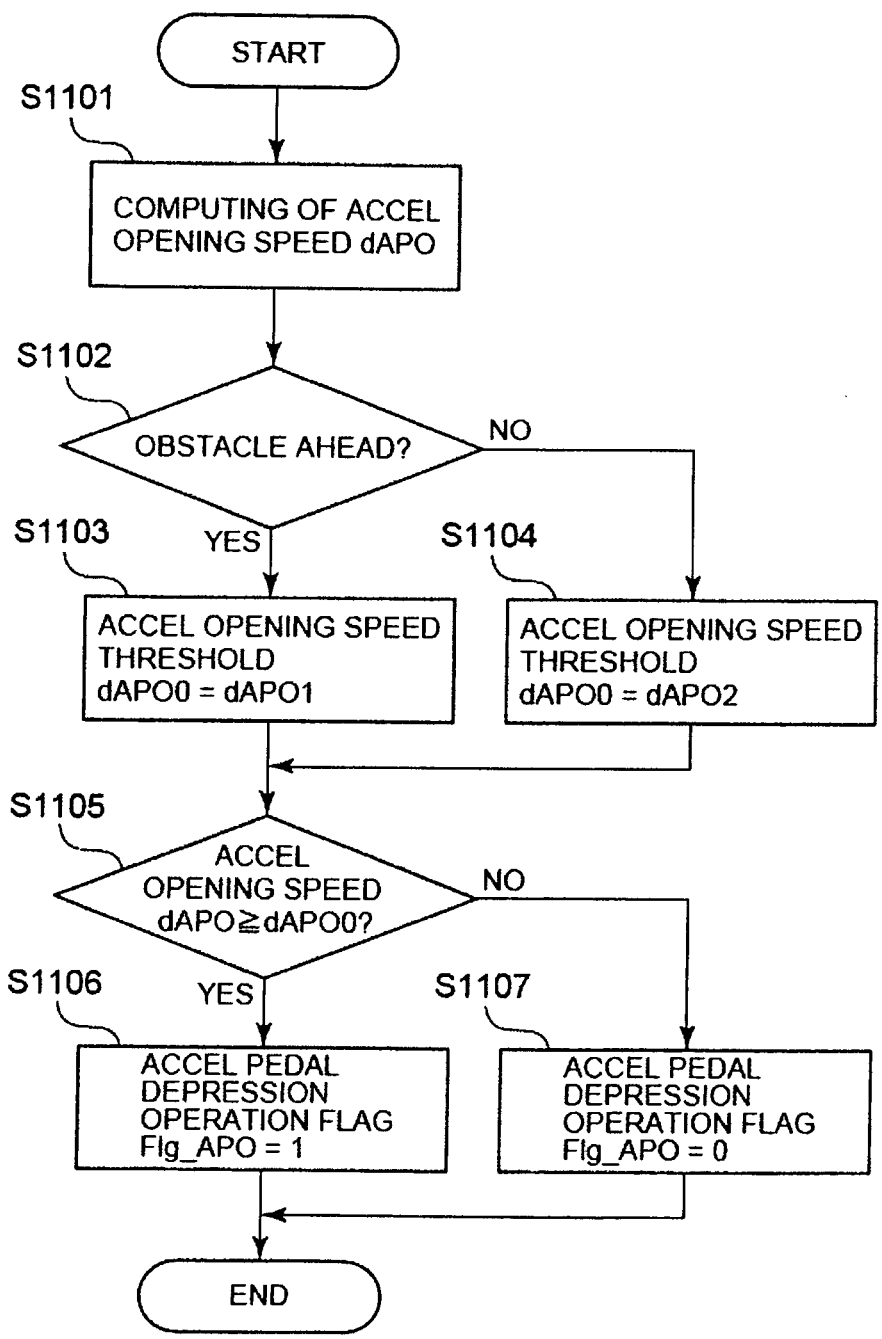
FIG. 26 is a flow chart illustrating the procedure for detecting depression of the accelerator pedal.

In this way, after computing target accelerator pedal opening final value APO0* in step S1000, the process goes to step S1100. In step S1100, the operation for detecting the accelerator pedal depression operation is carried out. In the following, an explanation will be given regarding the operation carried out in step S1100 with reference to the flow chart shown in FIG. 26.

In step S1101, by differential computation for accelerator pedal step-down amount APO by the driver detected by accelerator pedal step-down amount detecting part 73, the depression speed of accelerator pedal 72, that is, accelerator pedal opening speed dAPO, is computed.

Figure 27:
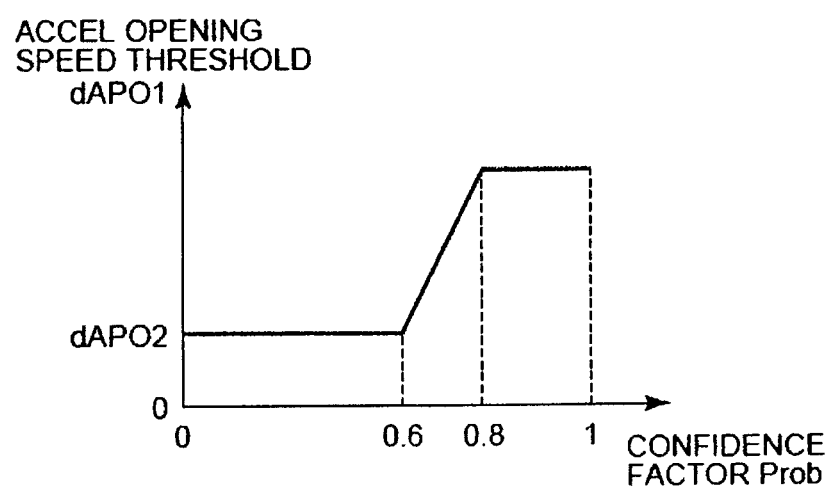
FIG. 27 is a diagram illustrating the relationship between the confidence factor and the accelerator opening speed threshold.

In step S1102, it is determined whether an obstacle exists ahead of the host vehicle. When an obstacle ahead of the host vehicle is detected by laser radar 10, the process goes to step S1103. In step S1103, accelerator opening speed threshold dAPO1 computed based on confidence factor Prob is set in accelerator opening speed threshold dAPO0 as the threshold for judging the depression operation of accelerator pedal 72. FIG. 27 is a diagram illustrating the relationship between confidence factor Prob of the obstacle and accelerator opening speed threshold dAPO1. As shown in FIG. 27, the larger the confidence factor Prob, the larger accelerator opening speed threshold dAPO1. When confidence factor Prob is smaller, accelerator opening speed threshold dAPO1 is set smaller. Consequently, the smaller the confidence factor Prob of the obstacle, the earlier the depression by the driver on the accelerator pedal can be detected.

When it is determined that no obstacle exists ahead of the host vehicle in step S1102, the process goes to step 1104, and preset value dAPO2 is set as accelerator opening speed threshold dAPO0. Here, value dAPO2 when there no obstacle exists ahead of the host vehicle corresponds to the minimum value of accelerator opening speed threshold dAPO1 in the plot of confidence factor Prob and accelerator opening speed threshold dAPO1 shown in FIG. 27.

In step S1105, it is determined whether accelerator opening speed dAPO computed in step S1101 exceeds accelerator opening speed threshold dAPO0 set in step S1103 or S1104. If dAPO≥dAPO0, it is determined that accelerator pedal 72 is depressed down, and the process goes to step S1106, and accelerator step-down operation flag Flg_APO is set to 1. On the other hand, when dAPO<dAPO0, it is determined that the driver is not stepping down accelerator pedal 72, that is, accelerator pedal 72 is maintained or reset, or accelerator pedal 72 is released. Then, the process goes to step S1107, and accelerator step-down operation flag Flg_APO is set to 0, that is, it is cleared.

Figure 28:
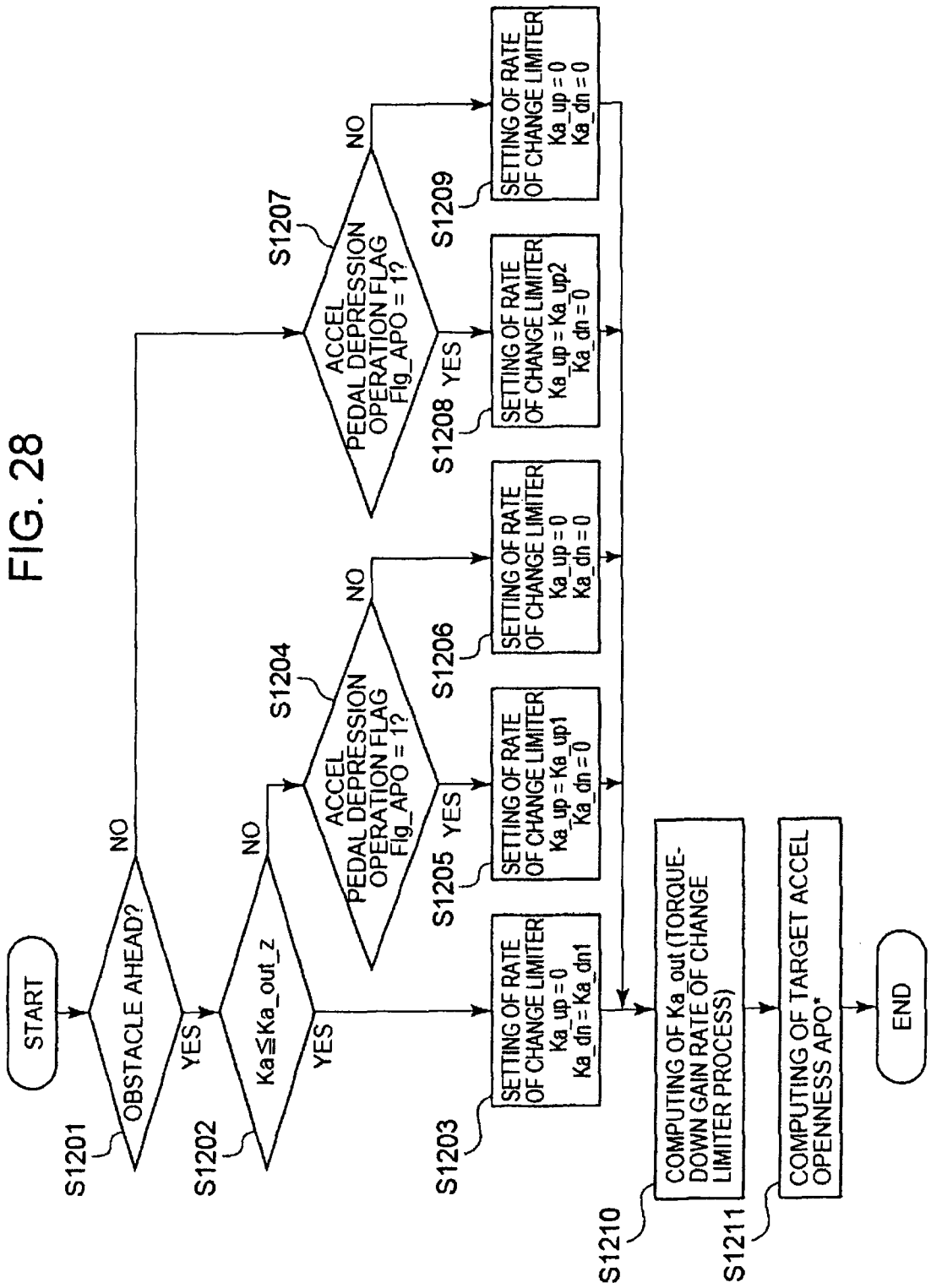
FIG. 28 is a flow chart illustrating the procedure for resetting the target accelerator opening.

In this way, after detection of the depression operation of accelerator pedal 72 in step S1100, the process goes to step S1200. In step S1200, the target accelerator opening is reset. In the following, an explanation will be given regarding the operation carried out in step S1200 with reference to the flow chart shown in FIG. 28.

In step S1201, it is determined whether an obstacle exists ahead of the host vehicle. When an obstacle ahead of the host vehicle is detected by laser radar 10, the process goes to step S1202, and it is determined whether torque down gain Ka computed in step S1040 is smaller than the previous-cycle value of the torque down gain output value Ka_out_z. If Ka≤Ka_out_z, the process goes to step S1203, and the change rate limiter for torque down gain Ka is set. Here, limiter Ka_up for increasing torque down gain Ka and limiter Ka_dn for decreasing it are set, respectively. Here, limiter Ka_up for increasing the torque down gain is set to zero, and limiter Ka_dn for decreasing the torque down gain are set to preset value Ka_dn1.

Figure 29:
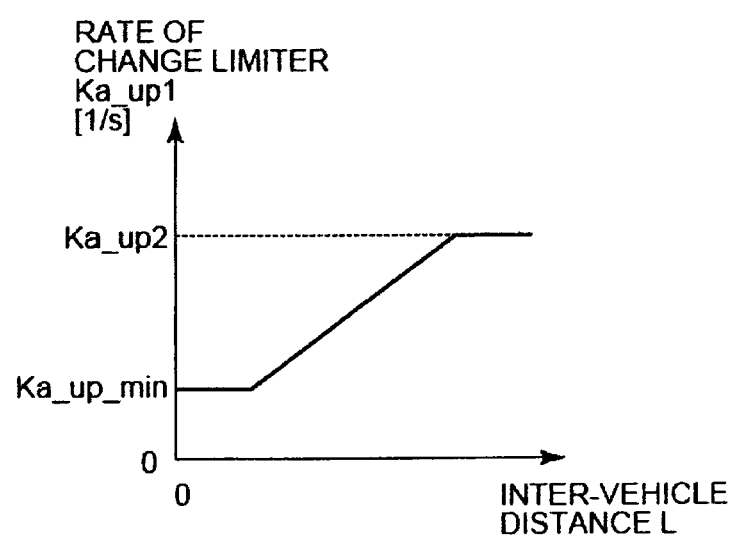
FIG. 29 is a diagram illustrating the relationship between the inter-vehicle distance and the torque down gain increasing limiter.

When it is determined that Ka>Ka_out_z in step S1202, the process goes to step S1204, and it is determined whether accelerator step-down operation flag Flg_APO set in step S1100 is 1. If the accelerator step-down operation flag Flg_APO=1, that is, accelerator pedal 72 is depressed down, the process goes to step S1205. In step S1205, as limiter Ka_up for increasing the torque down gain, value Ka_up1 is set based on inter-vehicle distance L between the host vehicle and the obstacle ahead of the host vehicle, while limiter Ka_dn for decreasing the torque down gain is set to zero. FIG. 29 is a diagram illustrating the relationship between inter-vehicle distance L and limiter Ka_up1 for increasing the torque down gain. As shown in FIG. 29, with the minimum value of Ka_up_min and the maximum value of Ka_up2, the limiter Ka_up1 for increasing the torque down gain is set such that it is increased slowly as inter-vehicle distance L increases.

When it is determined in step S1204 that accelerator step-down operation flag Flg_APO=0, that is, accelerator pedal 72 is not depressed down, the process goes to step S1206. In step S1206, both limiter Ka_up for increasing the torque down gain and limiter Ka_dn for decreasing the torque down gain are set to zero.

When it is determined in step S1201 that no obstacle exists ahead of the host vehicle, the process goes to step S1207, and it is determined whether accelerator step-down operation flag Flg_APO is 1. If Flg_APO=1, the process goes to step S1208, and, as limiter Ka_up for increasing the torque down gain, Ka_up2 corresponding to the maximum value on the plot shown in FIG. 29 is set. In addition, limiter Ka_dn for decreasing the torque down gain is set to zero. When it is determined in step S1207 that Flg_APO=0, the process goes to step S1209, and both limiter Ka_up for increasing the torque down gain and limiter Ka_dn for decreasing the torque down gain are set to zero.

In step S1210, the change rate limiter process is performed using limiter Ka_up for increasing the torque down gain and limiter Ka_dn for decreasing the torque down gain for torque down gain Ka computed in step S1040 to compute torque down gain output value Ka_out.

In step S1211, based on torque down gain output value Ka_out computed in step S1210, target accelerator opening APO* for use as the instruction value to engine controller 74 is computed.

When Ka=Ka_out

With the following formula (Formula 45), target accelerator pedal opening final value APO0* computed in step S1000 is set to target accelerator opening APO*.

$$APO^* = APO0^* \quad \text{(Formula 42)}$$

When Ka ≠ Ka_out

By means of the following formula (Formula 43), target accelerator opening APO* is computed.

$$APO^* = APO \cdot \frac{Ka\_out}{100} + APO\_min \cdot \frac{100 - Ka\_out}{100} \quad \text{(Formula 43)}$$

In step S1300, target accelerator pedal opening APO* computed in step S1200 is output to engine controller 74, and, at the same time, target accelerator pedal reaction force correction value FA*corr computed in step S800 is output to accelerator pedal reaction force controller 70. Engine controller 74 controls the engine torque generation amount according to target accelerator opening APO* to perform engine torque control. Accelerator pedal reaction force controller 70 controls the accelerator pedal depression reaction force generated on accelerator pedal 72 corresponding to the target accelerator pedal reaction force correction value FA*corr. At this point, the current cycle ends.

In the Embodiment 1, the following operation effects can be displayed.

(1) When the inter-vehicle distance between the host vehicle and the obstacle ahead of the host vehicle becomes less than a prescribed distance (first inter-vehicle distance threshold L1*), inter-vehicle distance maintenance supporting system 1 applies a reaction force on accelerator pedal 72. Here, controller 50 computes confidence factor Prob indicating the continued presence of the obstacle ahead of the host vehicle based on the state of the obstacle. In addition, when it is detected that accelerator pedal 72 is depressed down, confidence factor Prob is corrected. As a result, when the driver tries to pass the obstacle ahead of the host vehicle by stepping down accelerator pedal 72, the obstacle ahead of the host vehicle can quickly be cancelled as an object for control of the reaction force, so that it is possible to prevent the problem in the related art of the obstacle ahead of the host vehicle being kept as an object control of the reaction force continues giving discomfort to the driver.

(2) When it is detected that accelerator pedal 72 is depressed down, controller 50 corrects confidence factor Prob based on inter-vehicle distance L between the host vehicle and the obstacle ahead of the host vehicle. When the host vehicle tries to pass the obstacle ahead of the host vehicle, by correcting confidence factor Prob corresponding to the relative-position relationship in this state, it is possible to reliably correct confidence factor Prob.

(3) More specifically, the shorter the inter-vehicle distance L, the smaller the confidence factor Prob. Because it is believed that the passing time is shorter when the host vehicle is closer to the obstacle ahead of the host vehicle, by reducing confidence factor Prob, it is possible to quickly cancel the obstacle ahead of the host vehicle as an object for control.

(4) Controller 50 filters the detected value of yaw rate sensor 30, and uses the filtered yaw rate in computing the predicted running path of the host vehicle. Then, the relative position of the obstacle ahead of the host vehicle with respect to the predicted running path, or, more specifically, offset value α, is used in computing confidence factor Prob. As a result, it is possible to compute confidence factor Prob based on the predicted running path that reflects the driver turning the steering wheel.

(5) When the confidence factor Prob is corrected, the filtering of the yaw rate is changed. When heavy filtering is performed, although it is possible to remove the noise and drift, the response nevertheless becomes slower. Here, when filtering is changed to light filtering, it is possible to obtain a yaw rate with quick response, and it is possible to compute swiftly the predicted running path that reflects the driver turning the steering wheel.

(6) Controller 50 increases the cutoff frequency for use in filtering when inter-vehicle distance L becomes shorter. In the state of passing the obstacle ahead of the host vehicle, the driver does not notice the noise and drift in the detected value of the yaw rate generated due to the driver turning the steering wheel. Here, by changing to light filtering with swift response ability, it is possible to obtain a detected value that can rapidly reflect the driver turning the steering wheel.

Embodiment 2

In the following, an explanation will be given regarding the inter-vehicle distance maintenance supporting system of Embodiment 2 of the present invention. The basic configuration of the inter-vehicle distance maintenance supporting system in Embodiment 2 is the same as that of Embodiment 1 above. In the following, an explanation will be given mainly regarding the points of difference from Embodiment 1 above.

In Embodiment 2, the future position of the obstacle ahead of the host vehicle with respect to the host vehicle is predicted, and the predicted position of the obstacle ahead of the host vehicle is used to compute confidence factor Prob. Here, prediction time t indicating the time in seconds to be predicted for the future position is set using inter-vehicle distance L between the host vehicle and the obstacle ahead of the host vehicle.

Figure 30:
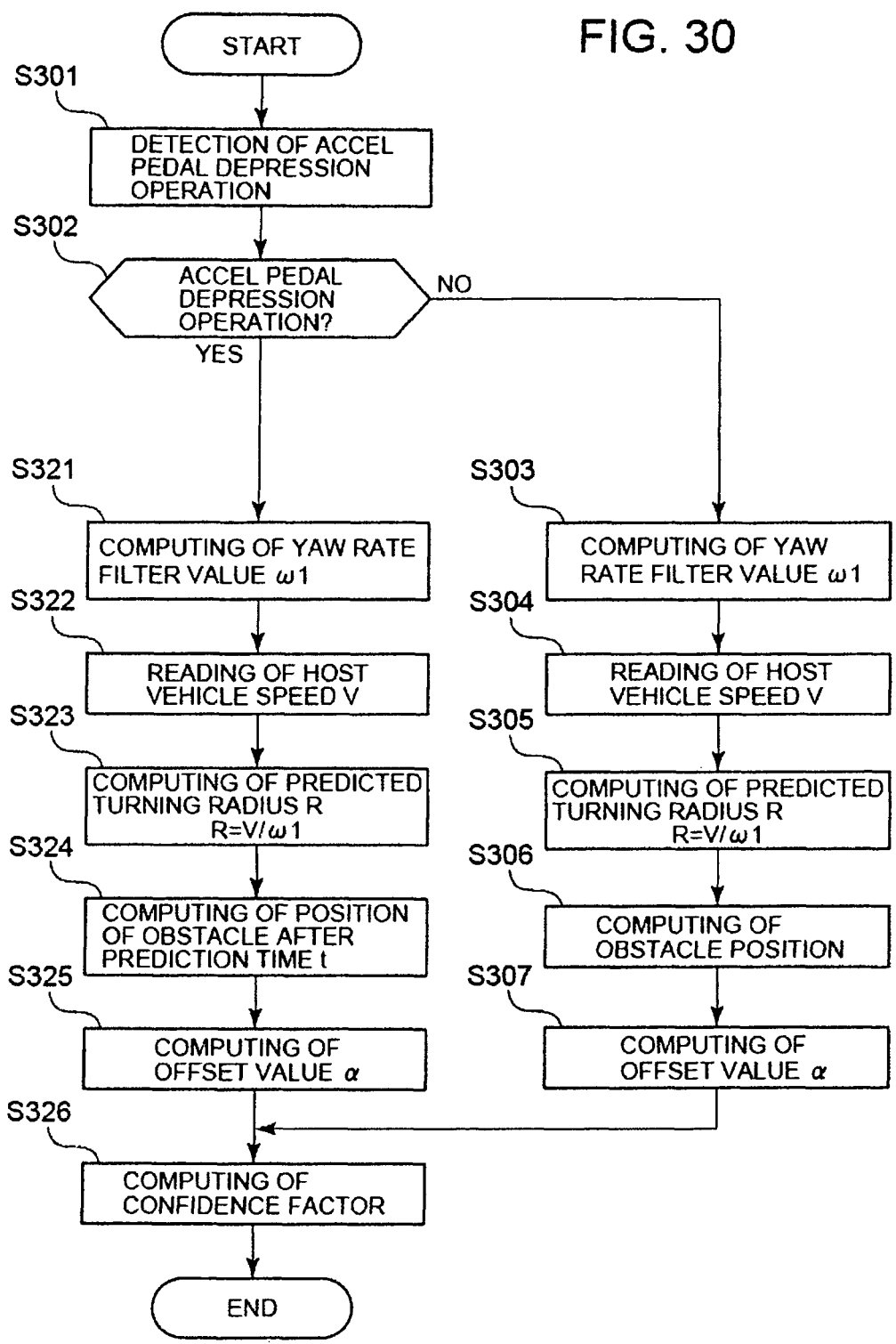
FIG. 30 is a flow chart illustrating the procedure for confidence factor computing in Embodiment 2.

In the following, an explanation will be given regarding computing the confidence factor Prob in Embodiment 2 with reference to the flow chart shown in FIG. 30. This is executed in step S300 of the flow chart shown in FIG. 4. Steps S301-S307 are the same as that shown in the flow chart of FIG. 5, so an explanation is omitted.

In step S321, Formula 1 above is used to compute yaw rate filter value ω1. In step S322, host vehicle speed V is read, and, in step S323, predicted turning radius R is computed from Formula 2 above.

Figure 31:
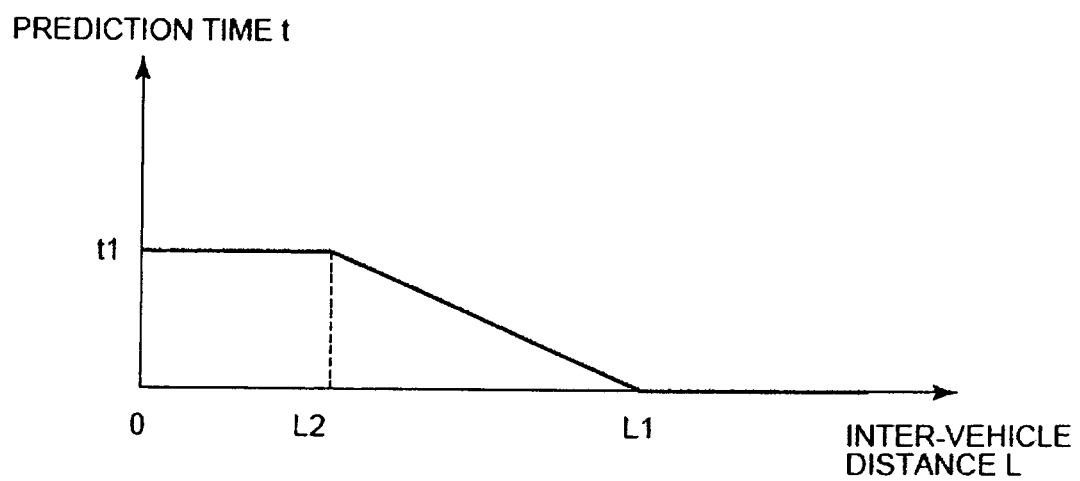
FIG. 31 is a diagram illustrating the relationship between the inter-vehicle distance and the prediction time.

In step S324, the position of the obstacle ahead of the host vehicle after prediction time t is computed. FIG. 31 shows the relationship between inter-vehicle distance L and prediction time t. When inter-vehicle distance L is greater than prescribed inter-vehicle distance L1, prediction time t=0, and the current position of the obstacle is computed. On the other hand, when inter-vehicle distance L is less than prescribed inter-vehicle distance L1, prediction time t is gradually increased. When it becomes less than prescribed inter-vehicle distance L2, prediction time t is fixed at the maximum value t1.

The closer the host vehicle is to the obstacle ahead of the host vehicle, the earlier the time for passing the obstacle ahead of the host vehicle can be predicted. Consequently, by predicting the position of the obstacle ahead of the host vehicle at a certain time later, it is possible to swiftly cancel the obstacle ahead of the host vehicle as an object for control.

Figure 32:
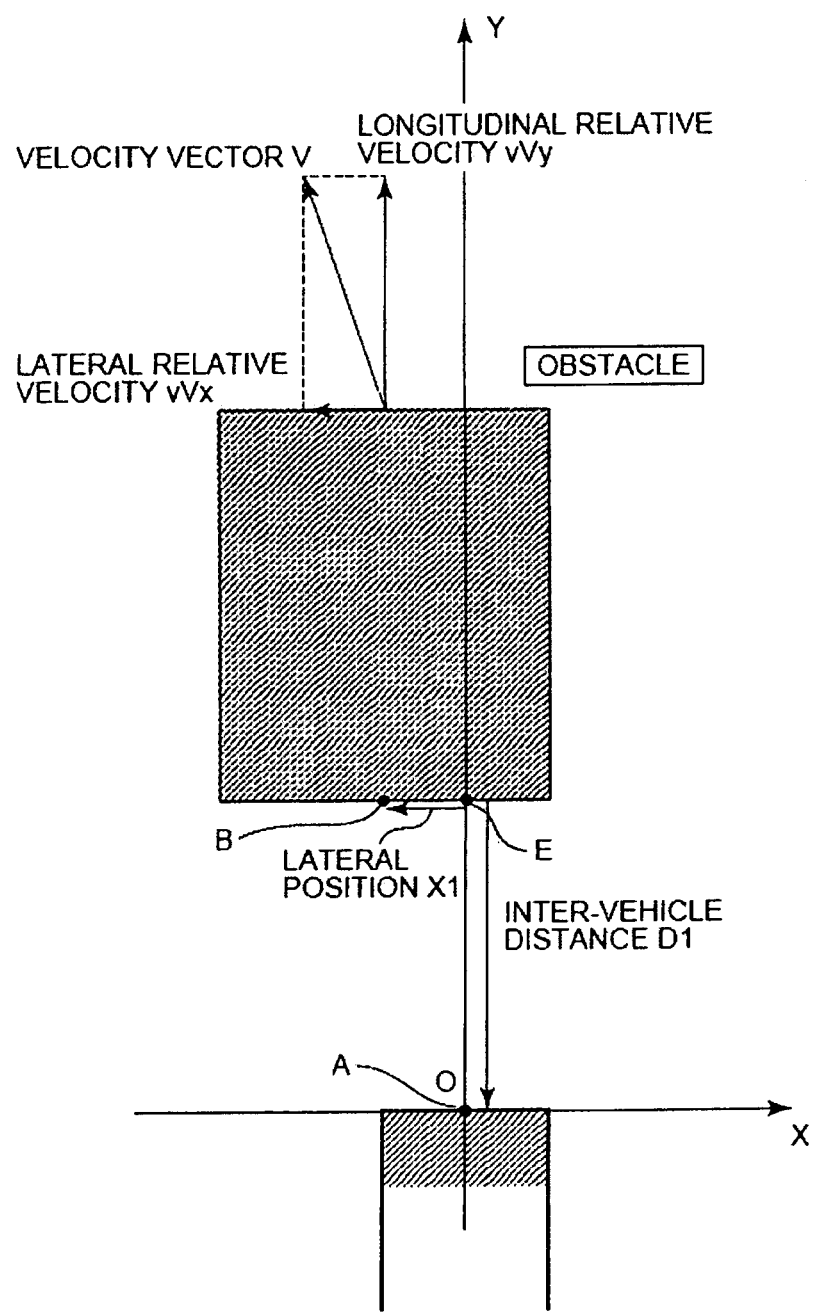
FIG. 32 is a diagram illustrating the procedure for computing the position of the obstacle after the prediction time.

In the following, an explanation will be given in reference to FIG. 32 regarding the method for computing the position of the obstacle ahead of the host vehicle at prediction time t later. In FIG. 32, D1 represents the inter-vehicle distance between the host vehicle and the obstacle ahead of the host vehicle at the present time, and X1 represents the lateral position of the obstacle ahead of the host vehicle with respect to the host vehicle. Here, inter-vehicle distance D1 and lateral position X1 correspond to distance L and offset value α in FIG. 8, respectively. If the longitudinal relative velocity and the lateral relative velocity between the host vehicle and the obstacle ahead of the host vehicle are vVy and vVx, respectively, the position of the obstacle ahead of the host vehicle at prediction time t later has the longitudinal position (inter-vehicle distance) of (D1+t×vVy) and the lateral position (offset value) of (X1+t×vVx).

In step S325, the position of the obstacle ahead of the host vehicle after the prediction time computed in step S324 is used to compute offset value α, and, in step S326, confidence factor Prob is computed.

Consequently, in Embodiment 2 explained above, in addition to the effects of Embodiment 1 above, the following effects can be realized.

(1) Controller 50 computes the relative position of the obstacle at prescribed time t later with respect to the predicted running path, and the relative position of the obstacle at computed prescribed time t is used to compute confidence factor Prob. In the state when accelerator pedal 72 is depressed down to pass the obstacle ahead of the host vehicle, by computing confidence factor Prob using the position of the obstacle at the prescribed time (prediction time) t, it is possible to swiftly cancel the obstacle ahead of the host vehicle as an object for control.

(2) The less the inter-vehicle distance L is between the host vehicle and the obstacle ahead of the host vehicle, the longer the prediction time t is set. Consequently, when the obstacle ahead of the host vehicle is to be passed, it is possible to swiftly cancel the obstacle ahead of the host vehicle as an object for control.

Also, instead of inter-vehicle distance L, accelerator pedal step-down amount APO of accelerator pedal 72 may be used, and a greater the accelerator pedal step-down amount APO, a greater prediction time t is set.

Embodiment 3

In the following, an explanation will be given regarding the inter-vehicle distance maintenance supporting system of Embodiment 3 of the present invention. The basic configuration of the inter-vehicle distance maintenance supporting system in Embodiment 3 is the same as that in Embodiment 1. In the following, an explanation will be given mainly on the points of difference from Embodiment 1.

In Embodiment 1, by changing the response of filtering with respect to yaw rate ω detected by yaw rate sensor 30, confidence factor Prob is decreased in an earlier stage when passing the obstacle ahead of the host vehicle. In Embodiment 3, confidence factor Prob computed based on offset value α is directly corrected.

Figure 33:
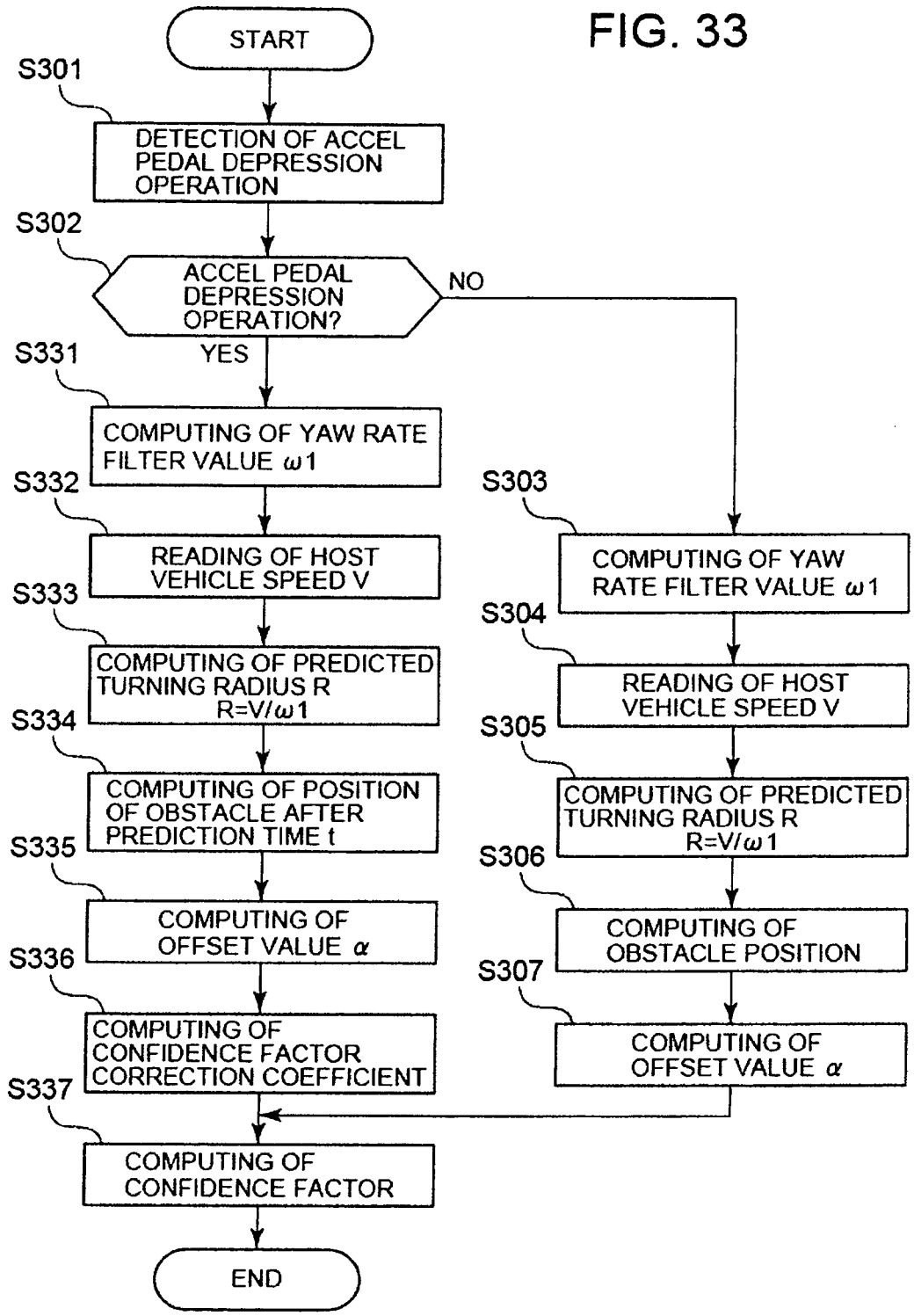
FIG. 33 is a flow chart illustrating the procedure for computing the confidence factor in Embodiment 3.

In the following, an explanation will be given regarding computing confidence factor Prob in Embodiment 3 with reference to the flow chart shown in FIG. 33. This treatment is executed in step S300 in the flow chart shown in FIG. 4. Steps S301-S307 are the same as in the flow chart shown in FIG. 5, and will not be explained in detail again.

In step S331, the above formula (Formula 1) is used to compute yaw rate filter value ω1. In step S332, host vehicle speed V is read. In step S333, predicted turning radius R is computed from the above formula (Formula 2). In step S334, the Formulas 3-15 are used to compute the position of the obstacle ahead of the host vehicle. In step S335, Formulas 16 and 17 are used to compute offset value α.

Figure 34:
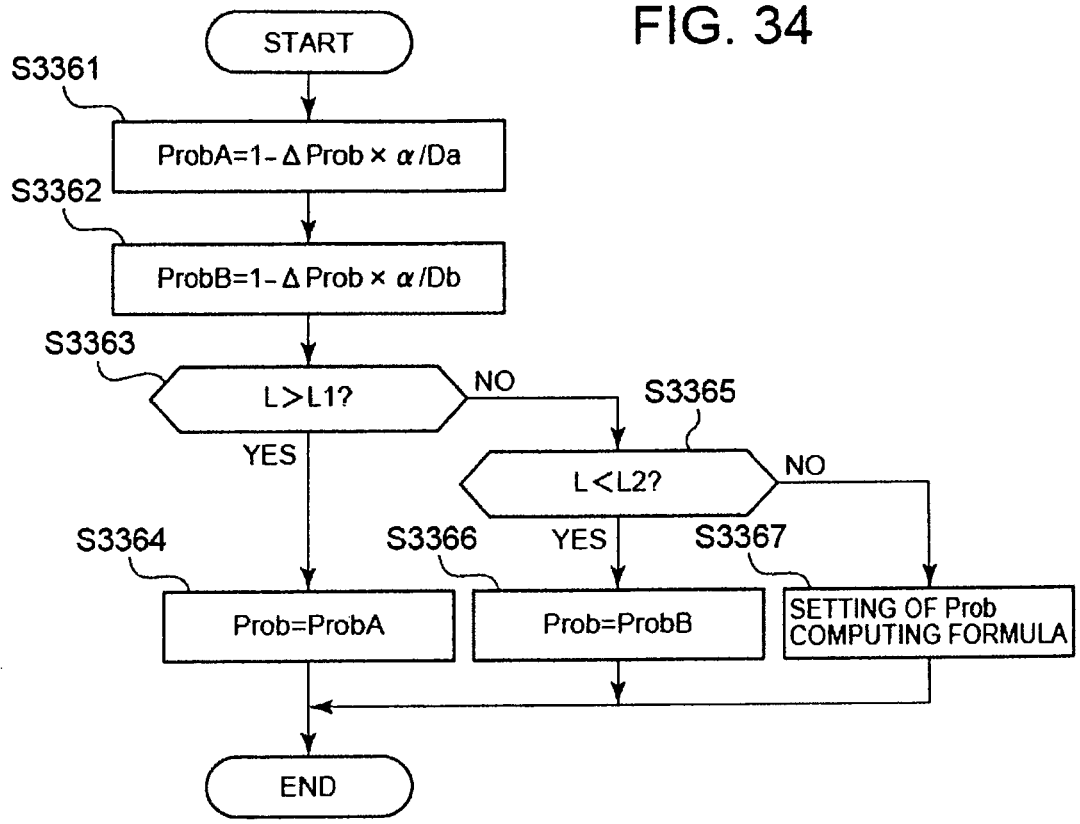
FIG. 34 is a flow chart illustrating the procedure for computing the confidence factor correction coefficient.

In step S336, the confidence factor correction coefficient for correcting the confidence factor is computed. More specifically, the slope of the confidence factor computing formula (confidence factor correction coefficient) is changed to correspond to inter-vehicle distance L between the host vehicle and the obstacle ahead of the host vehicle, and the formula for computing confidence factor Prob is changed. In the following, an explanation will be given regarding this case with reference to the flow chart shown in FIG. 34.

In step S3361, preset constant Da and confidence factor change amount ΔProb are used to set the first confidence factor computing formula represented by the following formula (Formula 44).

$$Prob A = 1 - \Delta Prob \times \alpha / Da \quad \text{(Formula 44)}$$

In step S3362, preset constant Db and confidence factor change amount ΔProb are used to set the second confidence factor computing formula represented by the following formula (Formula 45).

$$Prob B = 1 - \Delta Prob \times \alpha / Db \quad \text{(Formula 45)}$$

Figure 35:
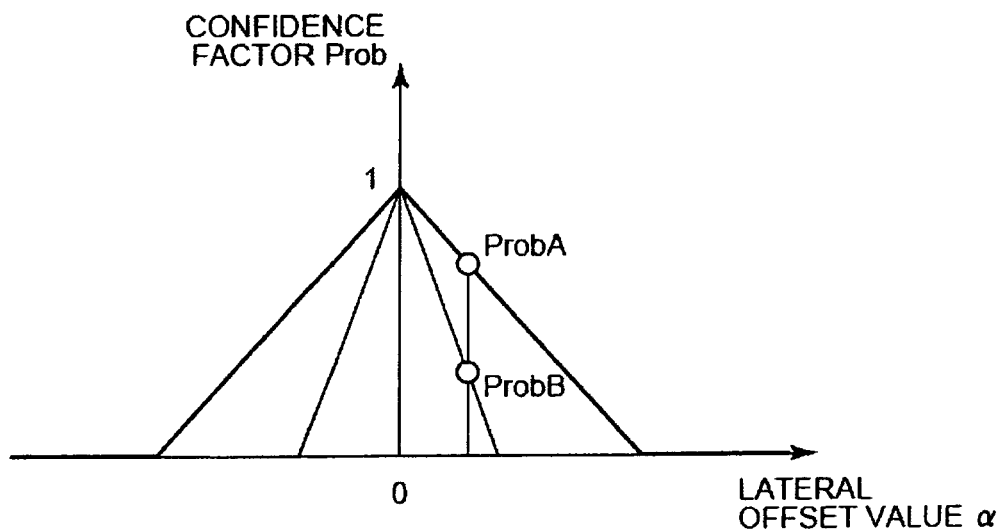
FIG. 35 is a diagram illustrating the relationship between the offset value and the confidence factor.

FIG. 35 is a diagram illustrating the relationship between the confidence factors ProbA, ProbB and offset value α. As shown in FIG. 35, when the absolute value of offset value α is increased, the confidence factors ProbA, ProbB are gradually reduced from 1. Here, the slope of confidence factor ProbB is set steeper than that of confidence factor ProbA.

In step S3363, it is determined whether inter-vehicle distance L between the host vehicle and the obstacle ahead of the host vehicle is greater than prescribed inter-vehicle distance L1. If L>L1, the process goes to step S3364, and the first confidence factor computing formula represented by Formula 44 is used to compute confidence factor ProbB (Prob=ProbA). On the other hand, when the result of judgment in step S3363 is NO, the process goes to step S3365, and it is determined whether inter-vehicle distance L is less than prescribed inter-vehicle distance L2 (<L1). If L<L2, the process goes to step S3366, and the second confidence factor computing formula represented by Formula 45 is used to compute confidence factor Prob for determination (Prob=ProbB).

If the judgment result in step S3365 is NO, the process goes to step S3367, and Formula 46 is used to set the confidence factor computing formula.

$$Prob = Prob B \times (L-L2)/(L1-L2) + Prob B \times (L1-L)/(L1-L2) \quad \text{(Formula 46)}$$

Here, Formula 46 is for interior-dividing confidence factor ProbA and confidence factor ProbB in inter-vehicle distance L, and it corresponds to the intermediate region between ProbA and ProbB shown in FIG. 35. The prescribed inter-vehicle distances L1, L2 are preset to appropriate values. Also, the first inter-vehicle distance threshold L1* and second inter-vehicle distance threshold L2* may also be used as the prescribed inter-vehicle distances L1, L2, respectively.

Then, in step S337, confidence factor Prob is computed using the computing formula determined in step S336. Also, when it is determined in step S302 that accelerator pedal 72 is not depressed, the first confidence factor computing formula as Formula 44 is used to compute confidence factor Prob.

In Embodiment 3 explained above, in addition to the effects of the Embodiment 1, the following operation effects can be realized.

(1) Controller 50 changes the coefficient for use in computing confidence factor Prob from the relative position of the obstacle corresponding to inter-vehicle distance L. More specifically, as shown in Formula 44 and Formula 45, the confidence factor computing formula is set, and, by changing the coefficient used in the formulas corresponding to inter-vehicle distance L between the host vehicle and the obstacle ahead of the host vehicle, confidence factor Prob is corrected. As a result, in the state when accelerator pedal 72 is depressed down to pass, the obstacle ahead of the host vehicle can be swiftly canceled as an object for control.

(2) As shown in FIG. 35, the shorter the inter-vehicle distance L, the steeper the slope of confidence factor Prob with respect to offset value α, and the larger the absolute value of the coefficient of the confidence factor computing formula. As a result, in the state when the host vehicle approaches to pass the obstacle ahead of the host vehicle, the obstacle can be swiftly canceled as an object for control.

Embodiment 4

In the following, an explanation will be given regarding Embodiment 4 of the inter-vehicle distance maintenance supporting system of the present invention. The basic configuration of Embodiment 4 is the same as that of Embodiment 1. Consequently, in the following, an explanation will be given mainly regarding the points of difference from Embodiment 1.

In Embodiment 1 above, when accelerator pedal 72 is depressed, the filtering for yaw rate ω is changed to a light filtering. However, in some cases, the operator may lift accelerator pedal 72 before the host vehicle has fully passed the obstacle ahead of the host vehicle, that is, before the current obstacle ahead of the host vehicle is fully canceled as an object for control. Consequently, in Embodiment 4, even after accelerator pedal 72 is no longer depressed, the light filtering is continued to compute confidence factor Prob for a prescribed time, so that the obstacle ahead of the host vehicle is reliably canceled as an object for control.

Figure 36:
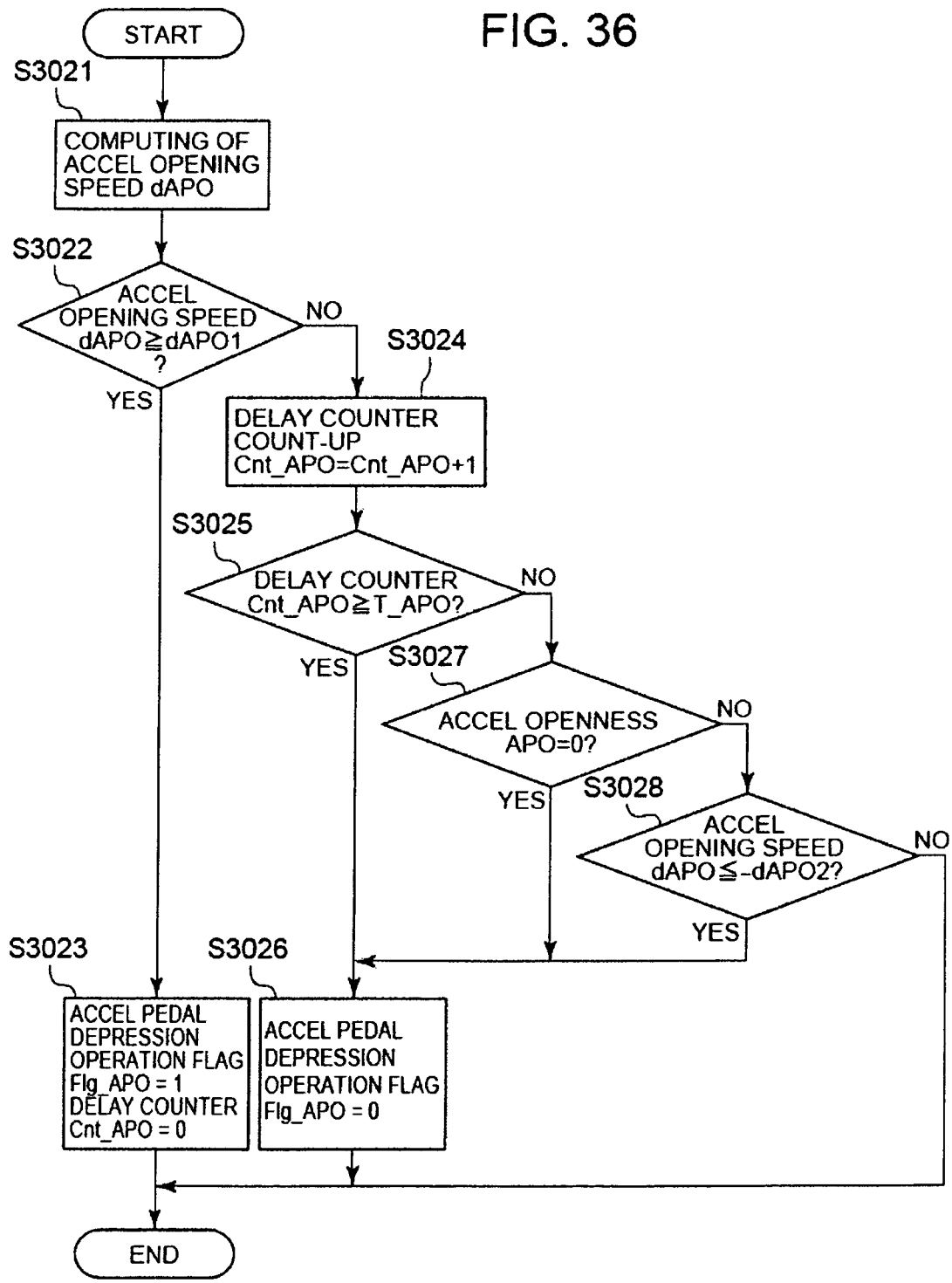
FIG. 36 is a flow chart illustrating the treatment procedure for accelerator pedal depression detection.

In the following, an explanation will be given regarding detecting depression of the accelerator pedal with reference to the flow chart shown in FIG. 36. This is executed in step S301 of the flow chart of the confidence factor computing shown in FIG. 5.

In step S3021, accelerator opening speed dAPO is computed. In step S3022, it is determined whether accelerator opening speed dAPO exceeds accelerator opening speed threshold dAPO1 that has been preset. If dAPO≥dAPO1, the process goes to step S3023, and accelerator step-down operation flag Flg_APO is set to 1. In addition, delay counter Cnt_APO is set to 0.

In step S3022, if it is found that dAPO<dAPO1, it is determined that the driver is not depressing accelerator pedal 72, that is, accelerator pedal 72 is held constant or reset, or accelerator pedal 72 is released. It then goes to step S3024, and delay counter Cnt_APO is counted up. In step S3025, it is determined whether delay counter Cnt_APO exceeds a preset time T_APO (say, 1 sec). If delay counter Cnt_APO is greater than prescribed time T_APO, the process goes to step S3026, and accelerator step-down operation flag Flg_APO is set to 0, that is, it is cleared.

On the other hand, when delay counter Cnt_APO is less than prescribed time T_APO, the process goes to step S3027, and it is determined whether accelerator pedal step-down amount APO is zero. If accelerator pedal step-down amount APO is zero, it is determined that the driver has lifted his foot from accelerator pedal 72, and it then goes to step S3026. Then, accelerator step-down operation flag Flg_APO is set to 0, that is, it is cleared.

In step S3027, if it is determined that accelerator pedal step-down amount APO is non-zero, the process goes to step S3028, and it is determined whether accelerator opening speed dAPO is less than preset accelerator opening speed threshold dAPO2. If accelerator opening speed dAPO is less than preset accelerator opening speed threshold dAPO2, it is determined that the driver is resetting accelerator pedal 72 at a speed higher than the prescribed operation speed, so that the process goes to step S3026, and accelerator step-down operation flag Flg_APO is set to zero, that is, it is cleared. Also, accelerator opening speed dAPO has a positive value when accelerator pedal 72 is depressed, and it has a negative value when accelerator pedal 72 is reset.

In step S3028, when it is determined that accelerator opening speed dAPO is greater than preset accelerator opening speed threshold dAPO2, it is determined that the driver is resetting accelerator pedal 72 at a speed lower than a prescribed speed, or the driver is keeping the depression amount of accelerator pedal 72 nearly constant. It is finished as is.

In this way, even when accelerator pedal 72 is no longer depressed, or, more specifically, even if the depression is not greater than accelerator opening speed threshold dAPO1, it is still determined that accelerator pedal 72 is depressed down during a prescribed time T_APO. Consequently, confidence factor Prob is computed using yaw rate correction value ω2 with a high response until the obstacle ahead of the host vehicle is canceled as an object for control for sure.

In Embodiment 4, detecting of the depression operation of accelerator pedal 72 may be performed along with Embodiment 2 or 3.

In the Embodiment 4, in addition to the effects of Embodiments 1-3, the following operation effects can be displayed.

Until a prescribed time after detection that accelerator pedal 72 is no longer depressed, it is determined that accelerator pedal 72 is being depressed, and confidence factor Prob is corrected. As a result, even when the driver lifts his foot from accelerator pedal 72 before the host vehicle fully passes the obstacle ahead of the host vehicle, correction of confidence factor Prob is still continued. Consequently, it is possible to prevent the discomfort felt by the driver caused by control of the operation reaction force with the obstacle ahead of the host vehicle to be passed as the object and the engine torque.

In Embodiments 1-4 the device that perform control of the accelerator pedal reaction force and control of the engine torque has been explained based on inter-vehicle distance L between the host vehicle and the obstacle ahead of the host vehicle. However, the present invention is not limited to this case. One may also adopt a scheme in which correction of the confidence factor is performed in a device that controls only the accelerator pedal reaction force corresponding to inter-vehicle distance L. Also, in the example explained above, correction is performed on target accelerator pedal reaction force FA* and target accelerator opening APO* corresponding to confidence factor Prob. However, the configuration may also be such that only one of them is corrected.

FIG. 9 is a diagram illustrating the relationship between inter-vehicle distance L and cutoff frequency correction value f'. FIG. 31 shows the relationship between inter-vehicle distance L and prediction time t. It may be set such that the shorter the inter-vehicle distance L, the larger the cutoff frequency correction value f' or the longer the prediction time t, and it is not restricted to the characteristics shown in FIG. 9 or 31.

In the above embodiments presented as examples, laser radar 10 and yaw rate sensor 30 function as obstacle detecting means; laser radar 10 functions as the inter-vehicle distance detecting means; accelerator pedal reaction force controller 70 functions as the accelerator pedal reaction force control means; and confidence factor computing part 52 functions as the confidence factor computing means and the confidence factor correcting means. Of course, confidence factor computing part 52 can function as the confidence factor computing means and the confidence factor correcting means even when accelerator pedal 72 is not depressed down. Yaw rate sensor 30 functions as the yaw rate detecting means; accelerator pedal step-down operation detecting part 60 functions as the accelerator pedal depression detecting means, and accelerator pedal reaction force correcting part 56 can function as the accelerator pedal reaction force correcting means. However, the present invention is not limited to the aforementioned scheme. As the obstacle detecting means, instead of laser radar 10, one may make use of a millimeter wave radar as another scheme, and the state of the obstacle can also be detected by inter-vehicle communication or the like. Merely an example is presented above. When the present invention is explained, there is no specific restriction on the corresponding relationship between the items of description of the embodiment and the description items in the Claims.

Given the disclosure of the present invention, one versed in the art would appreciate that there may be other embodiments and modifications within the scope of the invention. Accordingly, all modifications attainable by one versed in the art from the present disclosure within the scope of the present invention are to be included as further embodiments of the present invention. The scope of the present invention is to be defined as set forth in the following claims.

What is claimed is:

1. An inter-vehicle distance maintenance supporting system for a host vehicle, comprising:
    an obstacle detector configured to detect an obstacle ahead of the host vehicle;
    an inter-vehicle distance detector configured to detect an inter-vehicle distance between said host vehicle and said obstacle;
    a confidence factor computing device configured to compute a confidence factor for treating the obstacle as a preceding vehicle ahead of the host vehicle based on a state of the obstacle detected by said obstacle detector, the confidence factor being a value representing the probability of the obstacle being in a predicted running path of the host vehicle;
    a confidence factor correcting part configured to correct said confidence factor based on a relative-position relationship between said host vehicle and said obstacle;
    a reaction force controller configured to apply a reaction force on an accelerator pedal of the host vehicle based on said inter-vehicle distance detected by said inter-vehicle distance detector and said confidence factor corrected by said confidence factor correcting part;
    a yaw rate detector configured to detect a yaw rate of said host vehicle, and wherein said confidence factor computing device is configured to use the yaw rate detected by the yaw rate detector to compute a predicted running path of said host vehicle, and compute said confidence factor from a relative position of said obstacle with respect to said predicted running path, wherein said confidence factor correcting part is configured to correct said confidence factor by filtering of said yaw rate; and an accelerator pedal depression detector configured to detect a depression degree of said accelerator pedal being greater than a predetermined value;

wherein said confidence factor correcting part is configured to increase a cutoff frequency used in said filtering as said inter-vehicle distance becomes smaller, and wherein said confidence factor correcting part is configured to reduce said confidence factor when said accelerator pedal depression detector detects the depression degree being greater than the predetermined value thereby increasing the cutoff frequency.

2. The inter-vehicle distance maintenance supporting system according to claim 1, wherein said confidence factor correcting part is configured to reduce said confidence factor as said inter-vehicle distance becomes smaller.

3. The inter-vehicle distance maintenance supporting system according to claim 1, wherein said confidence factor correcting part is configured to compute the relative position of said obstacle after a prescribed time with respect to said predicted path, and to use the relative position of said obstacle after said prescribed time to compute said confidence factor.

4. The inter-vehicle distance maintenance supporting system according to claim 3, wherein said confidence factor correcting part is configured to increase said prescribed time as said inter-vehicle distance becomes smaller.

5. The inter-vehicle distance maintenance supporting system according to claim 1, wherein said confidence factor correcting part is configured to change a coefficient used in computing said confidence factor based on said inter-vehicle distance.

6. The inter-vehicle distance maintenance supporting system according to claim 5, wherein said confidence factor correcting part is configured to increase an absolute value of said coefficient as inter-vehicle distances becomes shorter.

7. The inter-vehicle distance maintenance supporting system according to claim 1, wherein said confidence factor correcting part is configured to reduce said confidence factor when said accelerator pedal depression detector detects depression of said accelerator pedal, and to continue to reduce said confidence factor for a prescribed time after depression of said accelerator pedal is ended.

8. The inter-vehicle distance maintenance supporting system according to claim 1, wherein said reaction force controller is configured to increase said reaction force as said confidence factor corrected by said confidence factor correcting part becomes larger.

9. The inter-vehicle distance maintenance supporting system according to claim 1,
wherein said confidence factor computing device is configured to compute said confidence factor based on a relative lateral position of a center of said host vehicle and a center of said obstacle.

10. An inter-vehicle distance maintenance supporting system for a host vehicle, comprising:
an obstacle detector configured to detect an obstacle ahead of the host vehicle;
an inter-vehicle distance detector configured to detect an inter-vehicle distance between said host vehicle and said obstacle;
a confidence factor computing device configured to compute a confidence factor for treating the obstacle as a preceding vehicle ahead of the host vehicle based on a state of the obstacle detected by said obstacle detector, the confidence factor being a value representing the probability of the obstacle being in a predicted running path of the host vehicle;
an accelerator pedal depression detector configured to detect depression of an accelerator pedal, and configured to detect a depression degree of said accelerator pedal being greater than a predetermined value;
a confidence factor correcting part configured to correct said confidence factor based on the depression of said accelerator pedal;
a reaction force controller configured to apply a reaction force on the accelerator pedal based on said inter-vehicle distance detected by said inter-vehicle distance detector and said confidence factor corrected by said confidence factor correcting part; and
a yaw rate detector configured to detect a yaw rate of said host vehicle, and wherein said confidence factor computing device is configured to use the yaw rate detected by the yaw rate detector to compute a predicted running path of said host vehicle, and compute said confidence factor from a relative position of said obstacle with respect to said predicted running path, wherein said confidence factor correcting part is configured to correct said confidence factor by filtering of said yaw rate,
wherein said confidence factor correcting part is configured to increase a cutoff frequency used in said filtering as said inter-vehicle distance becomes smaller, and wherein said confidence factor correcting part is configured to reduce said confidence factor when said accelerator pedal depression detector detects the depression degree being greater than the predetermined value thereby increasing the cutoff frequency.

11. An inter-vehicle distance maintenance supporting method for a host vehicle, comprising:
detecting an obstacle ahead of the host vehicle;
detecting an inter-vehicle distance between said host vehicle and said obstacle;
computing a confidence factor for treating the obstacle as a preceding vehicle of the host vehicle based on a detected obstacle state, the confidence factor being a value representing the probability of the obstacle being in a predicted running path of the host vehicle;
detecting a depression of an accelerator pedal;
correcting said confidence factor based on a relative-position relationship between said host vehicle and said obstacle;
applying a reaction force based on the inter-vehicle distance and the corrected confidence factor; and
detecting a yaw rate of said host vehicle, and wherein said predicted running path of said host vehicle is computed using said detected yaw rate, and said confidence factor is computed from a relative position of said obstacle with respect to said predicted running path, wherein said confidence factor is corrected by filtering of said yaw rate,
wherein a cutoff frequency used in said filtering is increased as said inter-vehicle distance becomes smaller, and said confidence factor is reduced when a depression degree is detected to be greater than a predetermined value thereby increasing the cutoff frequency.

12. The method according to claim 11,
wherein said confidence factor is computed based on a relative lateral position of a center of said host vehicle and a center of said obstacle.

13. The method according to claim 11,
wherein the reaction force is applied to the accelerator pedal of the vehicle.

14. An inter-vehicle distance maintenance supporting method for a host vehicle, comprising:
- detecting an obstacle ahead of the host vehicle;
- detecting an inter-vehicle distance between said host vehicle and said obstacle;
- computing a confidence factor for treating the obstacle as a preceding vehicle of the host vehicle based on a detected obstacle state, the confidence factor being a value representing the probability of the obstacle being in a predicted running path of the host vehicle;
- detecting a depression of an accelerator pedal;
- correcting said confidence factor based on the depression of the accelerator pedal;
- applying a reaction force based on the inter-vehicle distance and the corrected confidence factor; and
- detecting a yaw rate of said host vehicle, and wherein said predicted running path of said host vehicle is computed using said detected yaw rate, and said confidence factor is computed from a relative position of said obstacle with respect to said predicted running path, wherein said confidence factor is corrected by filtering of said yaw rate,
- wherein a cutoff frequency used in said filtering is increased as said inter-vehicle distance becomes smaller, and said confidence factor is reduced when a depression degree is detected to be greater than a predetermined value thereby increasing the cutoff frequency.

15. The method according to claim 14,
- wherein the reaction force is applied to the accelerator pedal of the vehicle.

* * * * *